United States Patent [19]

Kantner et al.

[11] Patent Number: 5,247,986
[45] Date of Patent: * Sep. 28, 1993

[54] METHOD OF FORMING MACROCOMPOSITE BODIES BY SELF-GENERATED VACUUM TECHNIQUES, AND PRODUCTS PRODUCED THEREFROM

[75] Inventors: Robert C. Kantner, Newark; Ratnesh K. Dwivedi, Wilmington, both of Del.

[73] Assignee: Lanxide Technology Company, LP, Newark, Del.

[*] Notice: The portion of the term of this patent subsequent to Nov. 17, 2009 has been disclaimed.

[21] Appl. No.: 824,686

[22] Filed: Jan. 21, 1992

Related U.S. Application Data

[63] Continuation of Ser. No. 383,935, Jul. 21, 1989, abandoned.

[51] Int. Cl.$^5$ .............................. B22D 19/14
[52] U.S. Cl. ................................ 164/97; 164/98; 164/100
[58] Field of Search ............... 164/97, 98, 100, 101, 164/102, 103, 104, 105, 91, 61, 62, 63

[56] References Cited

U.S. PATENT DOCUMENTS

| | | | |
|---|---|---|---|
| 918,069 | 4/1909 | Marius et al. | 164/97 |
| 2,606,831 | 8/1952 | Koehring | 75/246 |
| 3,364,976 | 1/1968 | Reding | 164/63 |
| 3,396,777 | 8/1968 | Reding | 164/63 |
| 3,529,655 | 9/1970 | Lawrence | 164/97 |
| 3,547,180 | 12/1970 | Cochran | 164/62 |
| 3,718,441 | 2/1973 | Landingham | 29/182.1 |
| 3,853,635 | 12/1974 | Demendi | 148/3 |
| 3,864,154 | 2/1975 | Gazza et al. | 29/123 B |
| 3,867,177 | 2/1975 | Ott et al. | 117/51 |
| 3,970,136 | 7/1976 | Cannell et al. | 164/108 |
| 4,232,091 | 11/1980 | Grimshaw et al. | 428/472 |
| 4,739,817 | 4/1988 | Hamajima et al. | 164/97 |
| 4,802,524 | 2/1989 | Donomoto | 164/97 |
| 4,828,008 | 5/1989 | White et al. | 164/66.1 |
| 4,871,008 | 10/1989 | Dwivedi et al. | 164/6 |
| 4,889,177 | 12/1989 | Charbonnier et al. | 164/97 |
| 4,932,099 | 6/1990 | Corwin | 164/97 |
| 4,935,055 | 6/1990 | Aghajanian et al. | 164/66.1 |

FOREIGN PATENT DOCUMENTS

| | | |
|---|---|---|
| 45002 | 2/1982 | European Pat. Off. . |
| 94353 | 11/1983 | European Pat. Off. . |
| 115742 | 8/1984 | European Pat. Off. . |
| 0291441 | 11/1988 | European Pat. Off. . |
| 0364963 | 4/1990 | European Pat. Off. . |
| 51-00551 | 1/1976 | Japan .......................... 164/80 |
| 60114532 | 11/1983 | Japan . |
| 59-10462 | 1/1984 | Japan . |
| 8603997 | 7/1986 | PCT Int'l Appl. ............ 164/100 |
| 2156718 | 10/1985 | United Kingdom .......... 164/102 |

Primary Examiner—Mark Rosenbaum
Assistant Examiner—Rex E. Pelto
Attorney, Agent, or Firm—Mark G. Mortenson; Stanislav Antolin

[57] ABSTRACT

The present invention relates to a novel process for forming macrocomposite bodies. Particularly, a suitable matrix metal, typically in a molten state, is in contact with a suitable mass of filler material or preform located adjacent to, or in contact with, at least one second material in the presence of a suitable reactive atmosphere in an impermeable container, at least at some point during the process, which permits a reaction to occur between the reactive atmosphere and the molten matrix metal and/or mass of filler material or preform and/or impermeable container, thereby causing molten matrix metal to infiltrate the mass of filler material or preform due to, at least in part, the creation of a self-generated vacuum. The impermeable container being sealed by a molten glassy material. Such self-generated vacuum infiltration occurs without the application of any external pressure or vacuum. The molten matrix metal infiltrates the mass of filler material or preform to such an extent that the molten matrix metal contacts at least a portion of the at least one second material. Upon cooling the matrix metal to a temperature below the melting point of the matrix metal, a macrocomposite body is formed comprising a metal matrix composite body bonded to at least a portion of the at least one second material.

45 Claims, 12 Drawing Sheets

METHOD OF FORMING MACROCOMPOSITE BODIES BY SELF-GENERATED VACUUM TECHNIQUES, AND PRODUCTS PRODUCED THEREFROM

This is a continuation of copending application Ser. No. 07/383,935 filed on Jul. 21, 1989, now abandoned.

FIELD OF THE INVENTION

The present invention relates to forming macrocomposite bodies. Particularly, a mass of a filler material or a preform is placed adjacent to, or in contact with, at least one second material. The mass of filler material or preform is then contacted with a molten matrix metal in the presence of a suitable reactive atmosphere in an impermeable container, and, at least at some point during the process, a reaction occurs between the reactive atmosphere and the molten matrix metal and/or mass of filler material or preform and/or impermeable container, thereby causing the molten matrix metal to infiltrate the mass of filler material or preform due to, at least in part, the creation of a self-generated vacuum. Such self-generated vacuum infiltration occurs without the application of any external pressure or vacuum. At some point during the matrix metal infiltration process, the matrix metal contacts the at least one second material. Upon cooling the matrix metal to a temperature below the melting point of the matrix metal, a macrocomposite body is formed comprising a metal matrix composite body bonded to at least a portion of the at least one second material.

BACKGROUND OF THE INVENTION

Composite products comprising a matrix metal and a strengthening or reinforcing phase such as ceramic particulates, whiskers, fibers or the like show great promise for a variety of applications because they combine some of the stiffness and wear resistance of the reinforcing phase with the ductility and toughness of the matrix metal. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents.

With powder metallurgy techniques, the metal in the form of a powder and the reinforcing material in the form of a powder, whiskers, chopped fibers, etc., are admixed and then either cold-pressed and sintered, or hot-pressed. The production of metal matrix composites by powder metallurgy techniques utilizing conventional processes imposes certain limitations with respect to the characteristics of the products attainable. The volume fraction of the ceramic phase in the composite is limited, in the case of particulates, typically to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136 granted Jul. 20, 1976 to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Other matrix metal-filler combinations are subject to the same considerations. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al. overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 1/4. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites.

In addition to application of pressure and wetting agents, it has been disclosed that an applied vacuum will aid the penetration of molten aluminum into a porous ceramic compact. For example, U.S. Pat. No. 3,718,441 granted Feb. 27, 1973 to R. L. Landingham reports infiltration of a ceramic compact (e.g., boron carbide, alumina and beryllia) with either molten aluminum, beryllium, magnesium, titanium, vanadium nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154 granted Feb. 4, 1975 to G. E. Gazza et al. also shows the use of vacuum to achieve infiltration. The patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

A method for making composite materials containing a reinforcing material such as fibers, wires, powder, whiskers or the like is disclosed in European Patent Application Publication No. 045,002, published on Feb. 3, 1982 in the name of Donomoto. A composite material is produced by placing a porous reinforcing material (e.g., aligned fibers of alumina, carbon, or boron) that is non-reactive with the atmosphere and a molten metal (e.g., magnesium or aluminum) into a container having an open portion, blowing substantially pure oxygen into the container, then immersing the container in a pool of the molten metal whereby the molten metal infiltrates the interstices of the reinforcing material. The publication discloses that the molten metal reacts with the oxygen present in the container to form a solid oxidized form of the metal, creating a vacuum in the container which draws molten metal through the interstices of the reinforcing material and into the container. In an alternative embodiment, the publication discloses placing an oxygen getter element (e.g., magnesium) within the container to react with the oxygen in the container to create a vacuum which, with the assistance of 50 kg/cm² argon pressurization of the molten metal, draws the molten metal (e.g., aluminum) into the container filled with reinforcing material (e.g., aligned carbon fibers).

U.S. Pat. No. 3,867,177 granted Feb. 18, 1975 to J. J. Ott et al. discloses a method for impregnating a porous body with a metal by first contacting the body with an "activator metal", then immersing the body in a "filler metal". Specifically, a porous mat or compacted body of filler material is immersed in a molten activator metal for a time sufficient to completely fill the interstices of the body with molten activator metal by the method of the Reding et al. U.S. Pat. No. 3,364,976, discussed below. Subsequently, upon solidification of the activator metal, the composite body is entirely immersed in a second metal and maintained for a time sufficient to allow the second metal to replace the activator metal to a desired extent. The formed body is then allowed to cool. It is also possible to at least partially remove the filler metal from within the porous body and replace it with at least a third metal, again by partially or totally immersing the porous body in a molten replacement metal for a sufficient time to dissolve or diffuse a desired amount of replacement metal into the porous body. The resultant body may also contain intermetallics of the metals in the interstices between the filler material. Utilizing a multiple step process, including the use of an activator metal to form a composite having a desired composition, is costly in both time and money. Further, the limitations on processing based on, e.g., compatibility of metals (i.e., solubility, melting point, reactivity, etc.), limit the ability to tailor the characteristics of the material for a desired purpose.

U.S. Pat. No. 3,529,655 granted Sep. 22, 1970 to G. D. Lawrence, discloses a process for forming composites of magnesium or magnesium alloys and silicon carbide whiskers. Specifically, a mold having at least one opening to the atmosphere and containing silicon carbide whiskers in the interior volume of the mold is immersed in a bath of molten magnesium so that all openings in the mold are below the surface of the molten magnesium for a time sufficient for the magnesium to fill the remaining volume of the mold cavity. It is said that as the molten metal enters the mold cavity it reacts with the air contained therein to form small amounts of magnesium oxide and magnesium nitride, thereby forming a vacuum which draws additional molten metal into the cavity and between the whiskers of silicon carbide. The filled mold is subsequently removed from the molten magnesium bath and the magnesium in the mold is allowed to solidify.

U.S. Pat. No. 3,364,976 granted Jan. 23, 1968 to John N. Reding et al. discloses creating a self-generated vacuum in a body to enhance penetration of a molten metal into the body. Specifically, a body, e.g., a graphite or steel mold, or a porous refractory material, is entirely submerged in a molten metal, e.g., magnesium, magnesium alloy or aluminum alloy. In the case of a mold, the mold cavity, which is filled with a gas, e.g., air, that is reactive with the molten metal, communicates with the externally located molten metal through at least one orifice in the mold. When the mold is submerged in the melt, filling of the cavity occurs as a vacuum is produced from the reaction between the gas in the cavity and the molten metal. Particularly, the vacuum is a result of the formation of a solid oxidized form of the metal.

U.S. Pat. No. 3,396,777 granted Aug. 13, 1968 to John N. Reding, Jr., discloses creating a self-generated vacuum to enhance penetration of a molten metal into a body of filler material. Specifically, the patent discloses a steel or iron container open to the atmosphere at one end, the container containing a particulate porous solid, e.g., coke or iron, and being covered at the open end with a lid having perforations or through-holes smaller in diameter than the particle size of the porous solid filler. The container also houses an atmosphere, e.g., air, within the porosity of the solid filler which is at least partially reactive with the molten metal, e.g., magnesium, aluminum, etc. The lid of the container is immersed a sufficient distance below the surface of the molten metal to prevent air from entering the container and the lid is held below the surface for a sufficient time for the atmosphere in the container to react with the molten metal to form a solid product. The reaction between the atmosphere and the molten metal results in a low pressure or substantial vacuum within the container and porous solid that draws the molten metal into the container and the pores of the porous solid.

The Reding, Jr., process is somewhat related to the processes disclosed by European Publication No. 045,002, and U.S. Pat. Nos., 3,867,177; 3,529,655, and 3,364,976, all of which were discussed above herein. Specifically, this Reding, Jr., Patent provides a bath of molten metal into which a container, containing a filler material therein, is immersed deeply enough to induce a reaction between gas in the cavity and the molten metal and to seal the cavity with the molten metal. In another aspect of this Patent, the surface of the molten bath of matrix metal, which may be subject to oxidation in the molten state when in contact with the ambient air, is covered with a protective layer or flux. The flux is swept aside when the container is introduced to the molten metal, but contaminants from the flux may nevertheless be incorporated into the bath of molten matrix metal and/or into the container and porous solid material to be infiltrated. Such contamination, even at very low levels, may be detrimental to the formation of the vacuum in the container, as well as to the physical properties of the resultant composite. Further, when the container is removed from the bath of molten matrix metal and excess matrix metal is drained from the container, loss of matrix metal from the infiltrated body can occur due to gravitational forces.

Accordingly, there has been a long felt need for a simple and reliable process for producing metal matrix composites and macrocomposite bodies containing metal matrix composites, which does not rely upon the use of externally applied pressure or vacuum, damaging wetting agents or the use of a pool of molten matrix metal, with their attendant disadvantages as noted above. In addition, there has been a long felt need for a process that minimizes the final machining operations needed to produce a metal matrix composite body or a macrocomposite body containing a metal matrix composite body. The present invention satisfies these and other needs by providing a process of forming macrocomposite bodies which involves a self-generated vacuum for infiltrating a material (e.g., a ceramic material), which can be formed into a preform, with a molten matrix metal (e.g., aluminum, magnesium, bronze, copper, cast iron, etc.) in the presence of a reactive atmosphere (e.g., air, nitrogen, oxygen, etc.) under normal atmospheric pressures.

DISCUSSION OF RELATED COMMONLY-OWNED PATENTS AND PATENT APPLICATIONS

A novel method of forming a metal matrix composite by infiltration of a permeable mass of filler contained in a ceramic matrix composite mold is disclosed in Commonly Owned U.S. Pat. No. 4,871,008, which issued on Oct. 3, 1989, by Dwivedi et al., and entitled "Method of Making Metal Matrix Composites". According to the method of the Dwivedi et al. invention, a mold is formed by the directed oxidation of a molten precursor metal or parent metal with an oxidant to develop or grow a polycrystalline oxidation reaction product which embeds at least a portion of a preform comprised of a suitable filler (referred to as a "first filler"). The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patent describes a method for the production of a metal matrix composite body, which may be bonded to a ceramic matrix composite body, and the novel bodies which are produced therefrom.

Another somewhat related Commonly Owned and Copending U.S. patent application is U.S. Ser. No. 168,284, now abandoned filed Mar. 15, 1988, in the names of Michael K. Aghajanian and Marc S. Newkirk and entitled "Metal Matrix Composites and Techniques for Making the Same." In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the infiltration continues. When a desired amount of permeable filler has been infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated filler material having a metal matrix therein will be directly bonded to excess metal remaining in the reservoir.

A method of forming macrocomposite bodies by a somewhat related process is disclosed in Commonly Owned and Copending U.S. patent application No. 07/376,416, now abandoned, filed on Jul. 7, 1989, in the names of Marc S. Newkirk et al., and entitled "Methods for Forming Macrocomposite Bodies and Macrocomposite Bodies Produced Thereby". This application is a continuation-in-part application of application Ser. No. 368,564, now abandoned filed on Jun. 20, 1989, in the names of Marc S. Newkirk et al., and entitled "Methods for Forming Macrocomposite Bodies and Macrocomposite Bodies Produced Thereby", which in turn is a continuation-in-part application of U.S. Pat. No. 5,040,588, which issued on Aug. 20, 1991, in the names of Marc S. Newkirk et al., and entitled "Methods for Forming Macrocomposite Bodies and Macrocomposite Bodies Produced Thereby". This patent and patent applications disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process similar to the process of the instant invention is disclosed in Commonly Owned and Copending U.S. patent application No. 07/888,241, filed May 22, 1992, and now allowed, which is a continuation of U.S. patent application Ser. No. 07/381,523, now abandoned, filed on Jul. 18, 1989, in the names of Robert C. Kantner et al., and entitled "A Method of Forming Metal Matrix Composite Bodies by a Self-Generated Vacuum Process and Products Produced Therefrom". This patent application discloses a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

The entire disclosures of the above-described commonly owned patents and patent applications are expressly incorporated herein by reference.

SUMMARY OF THE INVENTION

In the method of the present invention, a novel metal matrix composite body is produced by a novel self-generated vacuum technique, wherein a molten matrix metal infiltrates a permeable mass of filler material or preform which is disposed in an impermeable container. Specifically, a molten matrix metal and a reactive atmosphere are both in communication with the permeable mass, at least at some point during the process, and upon contact between the reactive atmosphere and the matrix metal and/or filler material or preform and/or impermeable container, a vacuum is generated, resulting in the molten matrix metal infiltrating the filler material or preform. Moreover, prior to infiltration, the filler material or preform is placed adjacent to, or in contact with, at least one second material, such that after infiltration of the filler material or preform, the infiltrated material is bonded to at least a portion of the at least one second material, thereby forming a macrocomposite body.

In a first preferred embodiment, a reaction system is provided comprising: (1) an impermeable container; (2) a mass of filler material or a preform contained therein; (3) at least one second material located adjacent to, or in contact with, the mass of filler material or the preform; (4) a molten matrix metal; (5) a reactive atmosphere; and (6) a sealing means for sealing the reaction system from the ambient atmosphere. The molten matrix metal is then contacted with the mass of filler material or preform in the presence of the reactive atmosphere and the sealing means. The reactive atmosphere reacts, either partially or substantially completely, with the molten matrix metal and/or the filler material and/or the impermeable container to form a reaction product which may create a vacuum, thereby drawing molten matrix metal at least partially into the filler material and into contact with at least a portion of the at least one second material. The reaction involving the reactive atmosphere and molten matrix metal and/or filler material and/or impermeable container may continue for a time sufficient to allow molten matrix metal to infiltrate, either partially or substantially completely, the filler material or preform. However, the molten matrix metal should infiltrate the filler material or preform to such an extent that the molten matrix metal contacts at least a portion of the at least one second material. An extrinsic sealing means for sealing the reaction system, having a composition different from the matrix metal, may be provided.

In another preferred embodiment, the matrix metal may react with the ambient atmosphere to form an intrinsic chemical sealing means, having a composition different from the matrix metal, which seals the reaction system from the ambient atmosphere.

In a further embodiment of the invention, rather than providing an extrinsic sealing means for sealing the reaction system, an intrinsic physical seal may be formed by the matrix metal wetting the impermeable container and/or any portion of the at least one second material, which might extend above the surface of the molten matrix metal after the molten matrix metal has been added to the impermeable container, thus sealing the reaction system from the ambient atmosphere. Further, it may be possible to incorporate alloying additives into the matrix metal which facilitate wetting of the impermeable container and/or at least one second material by the matrix metal, thus sealing the reaction system from the ambient atmosphere.

In another preferred embodiment, the filler material may react, at least partially, with the reactive atmosphere to create a vacuum which draws molten matrix metal into the filler material or preform. Moreover, additives may be incorporated into the filler material which may react, either partially or substantially completely, with the reactive atmosphere to create a vacuum, as well as enhance the properties of the resultant body. Furthermore, in addition to or instead of the filler material and the matrix metal, the impermeable container may at least partially react with the reactive atmosphere to generate a vacuum.

DEFINITIONS

As used in the present specification and the appended claims, the terms below are defined as follows:

"Alloy Side", as used herein, refers to that side of a metal matrix composite which initially contacted molten matrix metal before that molten metal infiltrated the permeable mass of filler material or preform.

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ambient Atmosphere", as used herein, refers to the atmosphere outside the filler material or preform and the impermeable container. It may have substantially the same constituents as the reactive atmosphere, or it may have different constituents.

"Barrier" or "barrier means", as used herein, in conjunction with metal matrix composite bodies, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are either wettable or non-wettable by the migrating molten matrix metal under the process conditions employed, so long as wetting of the barrier means does not proceed substantially beyond the surface of the barrier material (i.e., surface wetting). A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product.

"Bonded", as used herein, means any method of attachment between two bodies. The attachment may be physical and/or chemical and/or mechanical. A physical attachment requires that at least one of the two bodies, usually in a liquid state, infiltrates at least a portion of the microstructure of the other body. This phenomenon is commonly known as "wetting". A chemical attachment requires that at least one of the two bodies chemically react with the other body to form at least one chemical bond between the two bodies. One method of forming a mechanical attachment between the two bodies includes a macroscopic infiltration of at least one of the two bodies into the interior of the other body. An example of this would be the infiltration of at least one of the two bodies into a groove or slot on the surface of the other body. Such mechanical attachment does not include microscopic infiltration or "wetting" but may be used in combination with such physical attachment techniques.

An additional method of mechanical attachment includes such techniques as "shrink fitting", wherein one body is attached to the other body by a pressure fit. In this method of mechanical attachment, one of the bodies would be placed under compression by the other body.

"Bronze", as used herein, means and includes a copper rich alloy, which may include iron, tin, zinc, aluminum, silicon, beryllium, manganese and/or lead. Specific bronze alloys include those alloys in which the proportion of copper is about 90% by weight, the proportion of silicon is about 6% by weight, and the proportion of iron is about 3% by weight.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Cast Iron", as used herein, refers to the family of cast ferrous alloys wherein the proportion of carbon is at least about 2% by weight.

"Copper", as used herein, refers to the commercial grades of the substantially pure metal, e.g., 99% by weight copper with varying amounts of impurities contained therein. Moreover, it also refers to metals which are alloys or intermetallics which do not fall within the definition of bronze, and which contain copper as the major constituent therein.

"Filler", as used herein, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Impermeable Container", as used herein, means a container which may house or contain a reactive atmosphere and a filler material (or preform) and/or molten matrix metal and/or a sealing means and/or at least a portion of at least one second material, under the process conditions, and which is sufficiently impermeable to the transport of gaseous or vapor species through the container, such that a pressure difference between the ambient atmosphere and the reactive atmosphere can be established.

"Macrocomposite" or "Macrocomposite Body", as used herein, means any combination of two or more materials selected from the group consisting of a ceramic matrix body, a ceramic matrix composite body, a metal body, and a metal matrix composite body, which are intimately bonded together in any configuration, wherein at least one of the materials comprises a metal matrix composite body formed by a self-generated vacuum technique. The metal matrix composite body may be present as an exterior surface and/or as an interior surface. Further, the metal matrix composite body may be present as an interlayer between two or more of the materials in the group described above. It should be understood that the order, number, and/or location of a metal matrix composite body or bodies relative to residual matrix metal and/or any of the materials in the group discussed above, can be manipulated or controlled in an unlimited fashion.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity without any external means of support prior to being infiltrated by the matrix metal. The mass should be sufficiently porous to permit infiltration of the matrix metal. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reaction System", as used herein, refers to that combination of materials which exhibit self-generated vacuum infiltration of a molten matrix metal into a filler material or preform. A reaction system comprises at least an impermeable container having therein a permeable mass of filler material or preform, a reactive atmosphere and a matrix metal.

"Reactive Atmosphere", as used herein, means an atmosphere which may react with the matrix metal and/or filler material (or preform) and/or impermeable container to form a self-generated vacuum, thereby causing molten matrix metal to infiltrate into the filler material (or preform) upon formation of the self-generated vacuum.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Seal" or "Sealing Means", as used herein, refers to a gas-impermeable seal under the process conditions, whether formed independent of (e.g., an extrinsic seal) or formed by the reaction system (e.g., an intrinsic seal), which isolates the ambient atmosphere from the reactive atmosphere. The seal or sealing means may have a composition different from that of the matrix metal.

"Seal Facilitator", as used herein, is a material that facilitates formation of a seal upon reaction of the matrix metal with the ambient atmosphere and/or the impermeable container and/or the filler material or preform. The material may be added to the matrix metal, and the presence of the seal facilitator in the matrix metal may enhance the properties of the resultant composite body.

"Second Material", as used herein, refers to a material selected from the group consisting of a ceramic matrix body, a ceramic matrix composite body, a metal body, and a metal matrix composite body.

"Wetting Enhancer", as used herein, refers to any material, which when added to the matrix metal and/or the filler material or preform, enhances the wetting (e.g., reduces surface tension of molten matrix metal) of the filler material or preform by the molten matrix metal. The presence of the wetting enhancer may also enhance the properties of the resultant metal matrix composite body by, for example, enhancing bonding between the matrix metal and the filler material.

BRIEF DESCRIPTION OF THE FIGURES

The following figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

Figure 1:
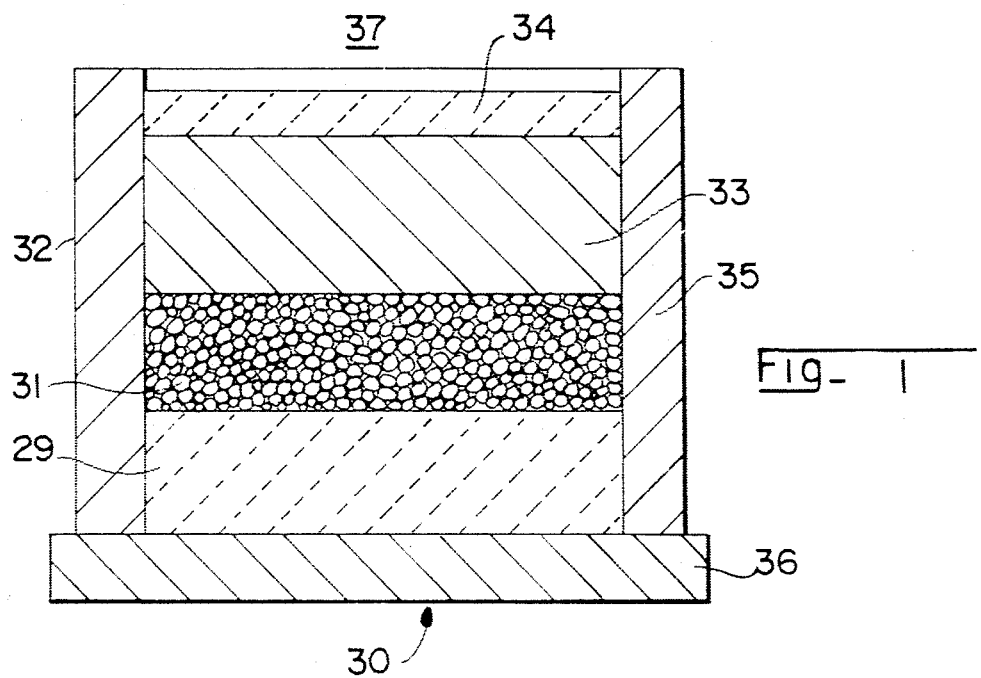
FIG. 1 is a schematic cross-sectional view of a typical lay-up according to the method of the present invention which utilizes an extrinsic sealing means.

With reference to FIG. 1, a typical lay-up 30 is illustrated for forming a macrocomposite body comprising a metal matrix composite body bonded to a second material, the metal matrix composite body being formed by a self-generated vacuum technique. Specifically, a filler material or preform 31, which may be of any suitable material as discussed in more detail below, is disposed adjacent to a second material, for example, a ceramic matrix composite body 29 in an impermeable container 32 which is capable of housing a molten matrix metal 33 and a reactive atmosphere. For example, the filler material 31 may be contacted with a reactive atmosphere (e.g., that atmosphere which exists within the porosity of the filler material or preform) for a time sufficient to allow the reactive atmosphere to permeate either partially or substantially completely the filler material 31 in the impermeable container 32. The matrix metal 33, in either a molten form or a solid ingot form, is then placed in contact with the filler material 31. As described in more detail below in a preferred embodiment, an extrinsic seal or sealing means 34 may be provided, for example, on the surface of the matrix metal 33, to isolate the reactive atmosphere from the ambient atmosphere 37. The sealing means, whether extrinsic or intrinsic, may or may not function as a sealing means at room temperature, but should function as a sealing means under the process conditions (e.g., at or above the melting point of the matrix metal). The lay-up 30 is subsequently placed into a furnace, which is either at room temperature or has been preheated to about the process temperature. Under the process conditions, the furnace operates at a temperature above the melting point of the matrix metal to permit infiltration of molten matrix metal into the filler material or preform, and into contact with at least a portion of the second material, by the formation of a self-generated vacuum.

Figure 2:
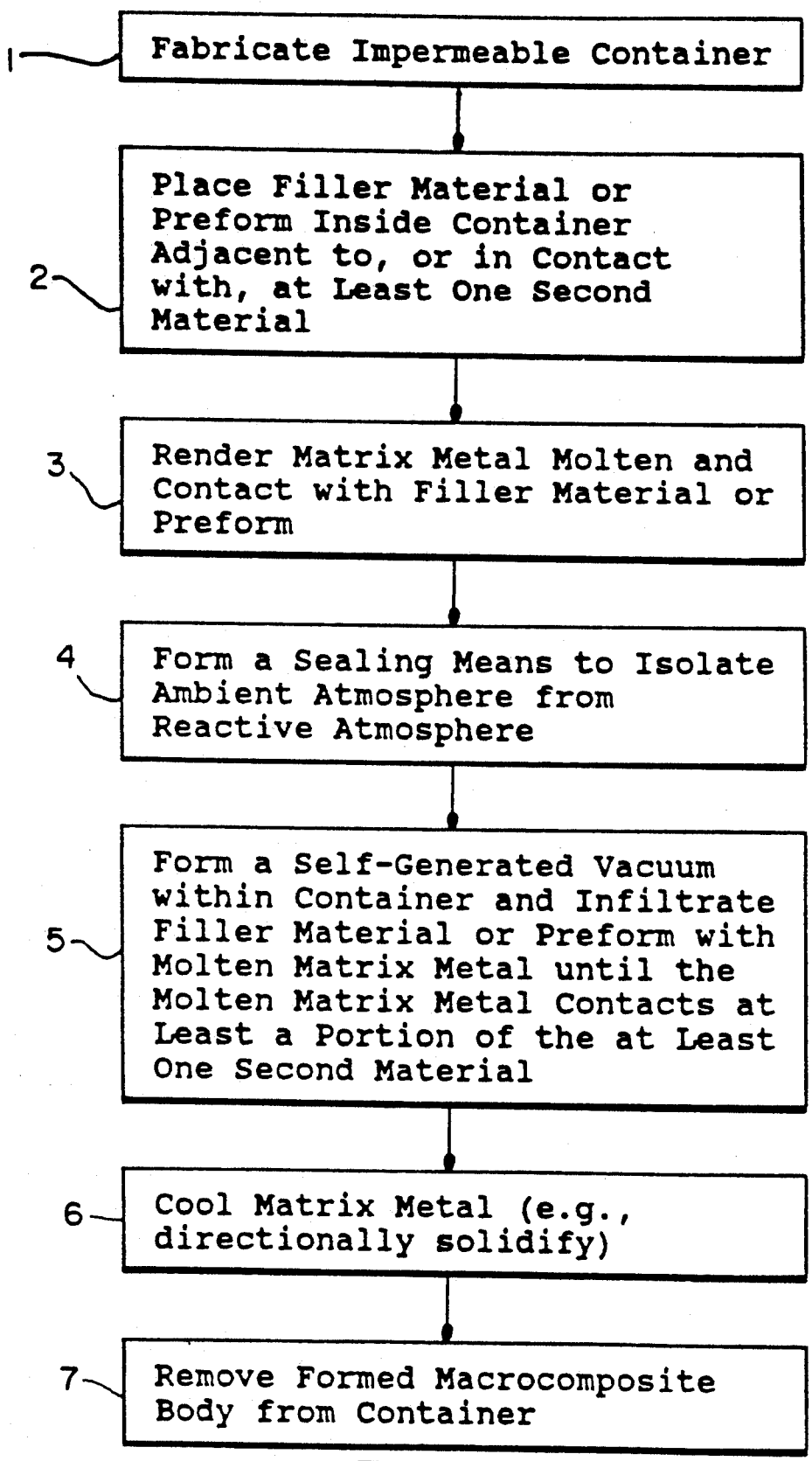
FIG. 2 is a simplified flowchart of the method of the present invention applied to a standard lay-up.

Referring to FIG. 2, there is shown a simplified flow-chart of process steps for carrying out the method of the present invention. In step (1), a suitable impermeable container can be fabricated or otherwise obtained that has the appropriate properties described in more detail below. For example, a simple open-topped steel (e.g., stainless steel) cylinder is suitable as a mold. The steel container may then optionally be lined with GRAFOIL ® graphite tape (GRAFOIL ® is a registered trademark of Union Carbide) to facilitate removal of the macrocomposite body which is to be formed in the container. As described in more detail below, other materials, such as $B_2O_3$ dusted inside the container, or tin which is added to the matrix metal, can also be used to facilitate release of the macrocomposite body from the container or mold. The container can then be loaded with a desired quantity of a suitable filler material or preform. Either before, during, or after the addition of the suitable filler material or preform, at least one second material is disposed within the impermeable container, either adjacent to, or in contact with, the suitable filler material or preform. The upper surface of the contents of the impermeable container, which is in contact with the ambient atmosphere, may then, optionally, be at least partially covered with another layer of GRAFOIL ® tape. That layer of graphite tape facilitates separation of the macrocomposite body from any carcass of matrix metal remaining after infiltration of the filler material.

A quantity of molten matrix metal, e.g., aluminum, bronze, copper, cast iron, magnesium, etc., can then be poured into the container. The container could be at room temperature or it could be preheated to any suitable temperature. Moreover, matrix metal could initially be provided as solid ingots of matrix metal and thereafter heated to render the ingots molten. An appropriate sealing means (described below in greater detail) selected from the group consisting of an extrinsic sealing means and an intrinsic sealing means can then be formed. For example, if it was desired to form an extrinsic seal, an extrinsic sealing means, such as a glass (e.g., $B_2O_3$) frit, can be applied to the surface of the pool of molten matrix metal in the container. The frit then melts, typically covering the surface of the pool, but, as described in more detail below, full coverage is not required. After contacting molten matrix metal with a filler material or preform and sealing the matrix metal and/or filler material from the ambient atmosphere by an extrinsic sealing means, if needed, the container is set in a suitable furnace, which may be preheated to the processing temperature, for a suitable amount of time to permit infiltration to occur. The processing temperature of the furnace may be different for different matrix metals (for example, about 950° C. for some aluminum alloys and about 1100° C. for some bronze alloys are desirable). The appropriate processing temperature will vary depending on the melting point and other characteristics of the matrix metal, as well as specific characteristics of components in the reaction system, such as the at least one second material, and the sealing means. After a suitable amount of time at temperature in the furnace, a vacuum will be created (described below in greater detail) within the filler material or preform, thereby permitting molten matrix metal to infiltrate the filler material or preform and contact at least a portion of the at least one second material. The container can then be removed from the furnace and cooled, for example, by placing it on a chill plate to directionally solidify the matrix metal. The macrocomposite body can then be removed in any convenient manner from the container.

It will be appreciated that the foregoing descriptions of FIGS. 1 and 2 are simple to highlight salient features of the present invention. Further details of the steps in the process and of the characteristics of the materials which can be used in the process are set forth below.

Without wishing to be bound by any particular theory or explanation, it is believed that when a suitable matrix metal, typically in a molten state, contacts a suitable filler material or preform, which is located adjacent to, or in contact with, at least one second material, in the presence of a suitable reactive atmosphere in an impermeable container, a reaction may occur between the reactive atmosphere and the molten matrix metal and/or filler material or preform and/or impermeable container that results in a reaction product (e.g., a solid, liquid or vapor) which occupies a lesser volume than the initial volume occupied by the reacting components. When the reactive atmosphere is isolated from the ambient atmosphere, a vacuum may be created in the permeable filler material or preform which draws molten matrix metal into the void spaces of the filler material. Continued reaction between the reactive atmosphere and the molten matrix metal and/or filler material or preform and/or impermeable container may result in the matrix metal infiltrating the filler material or preform as additional vacuum is generated. The reaction may be continued for a time sufficient to permit molten matrix metal to infiltrate, either partially or substantially completely, the mass of filler material or preform. The filler material or preform should be sufficiently permeable to allow the reactive atmosphere to permeate, at least partially, the mass of filler material or preform. In addition, in order to form a macrocomposite body, the molten matrix metal should infiltrate the mass of filler material or preform to such an extent that the molten matrix metal contacts at least a portion of the at least one second material.

This application discusses various matrix metals which at some point during the formation of a metal matrix composite are contacted with a reactive atmosphere. Thus various references will be made to particular matrix metal/reactive atmosphere combinations or systems which exhibit self-generated vacuum formation. Specifically, self-generated vacuum behavior has been observed in the aluminum/air system; the aluminum/oxygen system; the aluminum/nitrogen system; the bronze/air system; the bronze/nitrogen system; the copper/air system; the copper/nitrogen system and the cast iron/air system. However, it will be understood that matrix metal/reactive atmosphere systems other than those specifically discussed in this application may behave in a similar manner.

In order to practice the self-generated vacuum technique of the present invention, it is necessary for the reactive atmosphere to be physically isolated from the ambient atmosphere such that the reduced pressure of the reactive atmosphere which exists during infiltration will not be significantly adversely affected by any gas being transported from the ambient atmosphere. An impermeable container that can be utilized in the method of the present invention may be a container of any size, shape and/or composition which may or may not be nonreactive with the matrix metal and/or reactive atmosphere and that is impermeable to the ambient atmosphere under the process conditions. Specifically, the impermeable container may comprise any material (e.g., ceramic, metal, glass, polymer, etc.) which can survive the process conditions such that it maintains its size and shape and which prevents or sufficiently inhibits transport of the ambient atmosphere through the container. By utilizing a container which is sufficiently impermeable to transport of atmosphere through the container, it is possible to form a self-generated vacuum within the container. Further, depending on the particular reaction system used, an impermeable container which is at least partially reactive with the reactive atmosphere and/or matrix metal and/or filler material may be used to create or assist in creating a self-generated vacuum within the container.

The characteristics of a suitable impermeable container are freedom from pores, cracks or reducible oxides each of which may adversely interfere with the development or maintenance of a self-generated vacuum. It will thus be appreciated that a wide variety of materials can be used to form impermeable containers. For example, molded or cast alumina or silicon carbide can be used, as well as metals having limited or low solubility in the matrix metal, e.g., stainless steel for aluminum, copper and bronze matrix metals.

In addition, otherwise unsuitable materials such as porous materials (e.g., ceramic bodies) can be rendered impermeable by formation of a suitable coating on at least a portion thereof. Such impermeable coatings may be any of a wide variety of glazes and gels suitable for bonding to and sealing such porous materials. Furthermore, a suitable impermeable coating may be liquid at process temperatures, in which case the coating material should be sufficiently stable to remain impermeable under the self-generated vacuum, for example, by viscously adhering to the container or the filler material or preform. Suitable coating materials include glassy materials (e.g., $B_2O_3$) chlorides, carbonates, etc., provided that the pore-size of the filler or preform is small enough that the coating can effectively block the pores to form an impermeable coating.

The matrix metal used in the method of the present invention may be any matrix metal which, when molten under the process conditions, infiltrates the filler material or preform upon the creation of a vacuum within the filler material. For example, the matrix metal may be any metal, or constituent within the metal, which reacts with the reactive atmosphere under the process conditions, either partially or substantially completely, thereby causing the molten matrix metal to infiltrate the filler material or preform due to, at least in part, the creation of a vacuum therein. Further, depending on the system utilized, the matrix metal may be either partially or substantially non-reactive with the reactive atmosphere, and a vacuum may be created due to a reaction of the reactive atmosphere with, optionally, one or more other components of the reaction system, thereby permitting the matrix metal to infiltrate the filler material.

In a preferred embodiment, the matrix metal may be alloyed with a wetting enhancer to facilitate the wetting capability of the matrix metal, thus, for example, facilitating the formation of a bond between the matrix metal and the filler, reducing porosity in the formed metal matrix composite, reducing the amount of time necessary for complete infiltration, etc. Moreover, a material which comprises a wetting enhancer may also act as a seal facilitator, as described below, to assist in isolating the reactive atmosphere from the ambient atmosphere. Still further, in another preferred embodiment, wetting enhancer may be incorporated directly into the filler material rather than being alloyed with the matrix metal. The wetting enhancer may also facilitate the wetting capability of the matrix metal with the at least one second material, thereby permitting the production of a stronger and more cohesive macrocomposite body.

Thus, wetting of the filler material by the matrix metal may enhance the properties (e.g., tensile strength, erosion resistance, etc.) of the resultant metal matrix composite body. Further, wetting of the filler material by molten matrix metal may permit a uniform dispersion of filler throughout the formed matrix metal composite and improve bonding of the filler to the matrix metal. Useful wetting enhancers for an aluminum matrix metal include magnesium, bismuth, lead, tin, etc., and for bronze and copper include selenium, tellurium, sulfur, etc. Moreover, as discussed above, at least one wetting enhancer may be added to the matrix metal and/or filler material to impart desired properties to the resultant metal matrix composite body.

Moreover, it is possible to use a reservoir of matrix metal to ensure complete infiltration of matrix metal into the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which is molten at the processing temperature could be used as the reservoir metal. Molten metals frequently are very miscible with each other which would result in the reservoir metal mixing with the first source of matrix metal, so long as an adequate amount of time is given for the mixing to occur. Thus, by using a reservoir metal which is different in composition from the first source of matrix metal, it is possible to tailor the properties of the matrix metal to meet various operating requirements and thus tailor the properties of the metal matrix composite body.

The temperature to which the reaction system is exposed (e.g., processing temperature) may vary depending upon which matrix metals, filler materials or preforms, second materials, and reactive atmospheres are used. For example, for an aluminum matrix metal, the present self-generated vacuum process generally proceeds at a temperature of at least about 700° C. and preferably about 850° C. or more. Temperatures in excess of 1000° C. are generally not necessary, and a particularly useful range is 850° C. to 1000° C. For a bronze or copper matrix metal, temperatures of about 1050° C. to about 1125° C. are useful, and for cast iron, temperatures of about 1250° C. to about 1400° C. are suitable. Generally, temperatures which are above the melting point but below the volatilization point of the matrix metal may be used.

It is possible to tailor the composition and/or microstructure of the metal matrix during formation of the metal matrix composite component of the macrocomposite body to impart desired characteristics to the resulting macrocomposite body. For example, for a given system, the process conditions may be selected to control the formation of, e.g., intermetallics, oxides, nitrides, etc. Further, in addition to tailoring the composition of the metal matrix, other physical characteristics of the metal matrix composite component, e.g., porosity, may be modified by controlling the cooling rate of the metal matrix composite component. In some cases, it may be desirable for the metal matrix composite component to be directionally solidified by placing, for example, the container holding the formed macrocomposite body onto a chill plate and/or selectively placing insulating materials about the container. Further, additional properties (e.g., tensile strength) of the metal matrix composite component of the macrocomposite body may be controlled by using a heat treatment (e.g., a standard heat treatment which corresponds substantially to a heat treatment for the matrix metal alone, or one which has been modified partially or significantly). These techniques for modifying the properties of the metal matrix composite component of the macrocomposite body may be used to alter or modify the properties of the final macrocomposite body to meet certain industrial requirements.

Under the conditions employed in the method of the present invention, the mass of filler material or preform, which is located adjacent to, or in contact with, at least one second material, should be sufficiently permeable to allow the reactive atmosphere to penetrate or permeate the filler material or preform at some point during the process prior to isolation of the ambient atmosphere from the reactive atmosphere. By providing an appropriate filler material, the reactive atmosphere may, either partially or substantially completely, react upon contact with the molten matrix metal and/or filler material and/or impermeable container, thereby resulting in the creation of a vacuum which draws molten matrix metal into the filler material and into contact with at least a portion of the at least one second material. Moreover, the distribution of reactive atmosphere within the filler material does not have to be substantially uniform, however, a substantially uniform distribution of reactive atmosphere may assist in the formation of a desirable metal matrix composite body.

The inventive method of forming a metal matrix composite body is applicable to a wide variety of filler materials, and the choice of materials will depend largely on such factors as the matrix metal, the at least one second material, the processing conditions, the reactivity of molten matrix metal with the reactive atmosphere, the reactivity of the filler material with the reactive atmosphere, the reactivity of molten matrix metal with the impermeable container and the properties sought for the metal matrix composite component of the final macrocomposite product. For example, when the matrix metal comprises aluminum, suitable filler materials include (a) oxides (e.g., alumina); (b) carbides (e.g., silicon carbide); (c) nitrides (e.g., titanium nitride). If there is a tendency for the filler material to react adversely with the molten matrix metal, such reaction might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, and nitrides. Ceramics which are preferred for use in the present method include alumina and silicon carbide in the form of particles, platelets, whiskers and fibers. The fibers can be discontinuous (in chopped form) or in the form of continuous filaments, such as multifilament tows. Further, the composition and/or shape of the filler material or preform may be homogeneous or heterogeneous.

The size and shape of the filler material can be any that may be required to achieve the properties desired in the metal matrix composite component of the final macrocomposite product. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be required to obtain complete infiltration of a mass of smaller particles than for larger particles. Average filler material sizes ranging from less than 24 grit to about 500 grit are preferred for most technical applications. Moreover, by controlling the size (e.g., particle diameter, etc.) of the permeable mass of filler material or preform, the physical and/or mechanical properties of the formed metal matrix composite component of the final macrocomposite product may be tailored to meet an unlimited number of industrial applications. Still further, by incorporating a filler material comprising varying particle sizes of filler material, higher packing of the filler material may be achieved to tailor the metal matrix composite component of the macrocomposite body. Also, it is possible to obtain lower particle loadings, if desired, by agitating the filler material (e.g., shaking the container) during infiltration and/or by mixing powdered matrix metal with the filler material prior to infiltration.

The reactive atmosphere utilized in the method of the present invention may be any atmosphere which may react, at least partially or substantially completely, with the molten matrix metal and/or the filler material and/or the impermeable container, to form a reaction product which occupies a volume which is smaller than that volume occupied by the atmosphere and/or reaction components prior to reaction. Specifically, the reactive atmosphere, upon contact with the molten matrix metal and/or filler material and/or impermeable container, may react with one or more components of the reaction system to form a solid, liquid or vapor-phase reaction product which occupies a smaller volume that the combined individual components, thereby creating a void or vacuum which assists in drawing molten matrix metal into the filler material or preform. Reaction between the reactive atmosphere and one or more of the matrix metal and/or filler material and/or impermeable container, may continue for a time sufficient for the matrix metal to infiltrate, at least partially or substantially completely, the filler material. However, the molten matrix metal should infiltrate the filler material or preform to such an extent that the molten matrix metal contacts at least a portion of at least one second material which is located adjacent to, or in contact with, the mass of filler material or preform. For example, when air is used as the reactive atmosphere, a reaction between the matrix metal (e.g., aluminum) and air may result in the formation of reaction products (e.g., alumina and/or aluminum nitride, etc.). Under the process conditions, the reaction product(s) tend to occupy a smaller volume than the total volume occupied by the molten aluminum and the air. As a result of the reaction, a vacuum is generated, thereby causing the molten matrix metal to infiltrate the filler material or preform. Depending on the system utilized, the filler material and/or impermeable container may react with the reactive atmosphere in a similar manner to generate a vacuum, thus assisting in the infiltration of molten matrix metal into the filler material. The self-generated vacuum reaction may be continued for a time sufficient to result in the formation of a metal matrix composite body which is bonded to at least one second material to form a macrocomposite body.

In addition, it has been found that a seal, or sealing means, should be provided to help prevent or restrict gas flow from the ambient atmosphere into the filler material or preform (e.g., prevent flow of ambient atmosphere into the reactive atmosphere). Referring again to FIG. 1, the reactive atmosphere within the impermeable container 32 and filler material 31 should be sufficiently isolated from the ambient atmosphere 37 so that as the reaction between the reactive atmosphere and the molten matrix metal 33 and/or the filler material or preform 31 and/or the impermeable container 32 proceeds, a pressure difference is established and maintained between the reactive and ambient atmospheres until the desired infiltration has been achieved. It will be understood that the isolation between the reactive and ambient atmospheres need not be perfect, but rather only "sufficient", so that a net pressure differential is present (e.g., there could be a vapor phase flow from the ambient atmosphere to the reactive atmosphere so long as the flow rate was lower than that needed immediately to replenish the reactive atmosphere). As described above, part of the necessary isolation of the ambient atmosphere from the reactive atmosphere is provided by the impermeability of the container 32. Since most matrix metals are also sufficiently impermeable to the ambient atmosphere, the molten matrix metal pool 33 provides another part of the necessary isolation. It is important to note, however, that the interface between the impermeable container 32 and the matrix metal may provide a leakage path between the ambient and reactive atmospheres. Accordingly, a seal should be provided that sufficiently inhibits or prevents such leakage.

Suitable seals or sealing means may be classified as mechanical, physical, or chemical, and each of those may be further classified as either extrinsic or intrinsic. By "extrinsic" it is meant that the sealing action arises independently of the molten matrix metal, or in addition to any sealing action provided by the molten matrix metal (for example, from a material added to the other elements of the reaction system); by "intrinsic" it is meant that the sealing action arises exclusively from one or more characteristics of the matrix metal (for example, from the ability of the matrix metal to wet the impermeable container). An intrinsic mechanical seal may be formed by simply providing a deep enough pool of molten matrix metal or by submerging the filler material or preform, as in the above-cited patents to Reding and Reding et al. and those patents related thereto.

Nevertheless, it has been found that intrinsic mechanical seals as taught by, for example, Reding, Jr., are ineffective in a wide variety of applications, and they may require excessively large quantities of molten matrix metal. In accordance with the present invention, it has been found that extrinsic seals and the physical and chemical classes of intrinsic seals overcome those disadvantages of an intrinsic mechanical seal. In a preferred embodiment of an extrinsic seal, a sealing means may be externally applied to the surface of the matrix metal in the form of a solid or a liquid material which, under the process conditions, may be substantially non-reactive with the matrix metal. It has been found that such an extrinsic seal prevents, or at least sufficiently inhibits, transport of vapor-phase constituents from the ambient atmosphere to the reactive atmosphere. Suitable materials for use as extrinsic physical sealing means may be either solids or liquids, including glasses (e.g., boron or silicon glasses, $B_2O_3$, molten oxides, etc.) or any other material(s) which sufficiently inhibit transport of ambient atmosphere to the reactive atmosphere under the process conditions.

An extrinsic mechanical seal may be formed by pre-smoothing or prepolishing or otherwise forming the interior surface of the impermeable container contacting the pool of matrix metal so that gas transport between the ambient atmosphere and the reactive atmosphere is sufficiently inhibited. Glazes and coatings such as $B_2O_3$ that may be applied to the container to render it impermeable can also provide suitable sealing.

An extrinsic chemical seal could be provided by placing a material on the surface of a molten matrix metal that is reactive with, for example, the impermeable container. The reaction product could comprise an intermetallic, an oxide, a carbide, etc.

In a preferred embodiment of an intrinsic physical seal, the matrix metal may react with the ambient atmosphere to form a seal or sealing means having a composition different from the composition of the matrix metal. For example, upon reaction of the matrix metal with the ambient atmosphere a reaction product (e.g., MgO and/or magnesium aluminate spinel in the case of an Al-Mg alloy reacting with air, or copper oxide in the case of a bronze alloy reacting with air) may form which may seal the reactive atmosphere from the ambient atmosphere. In a further embodiment of an intrinsic physical seal, a seal facilitator may be added to the matrix metal to facilitate the formation of a seal upon reaction between the matrix metal and the ambient atmosphere (e.g., by the addition of magnesium, bismuth, lead, etc., for aluminum matrix metals, or by the addition of selenium, tellurium, sulfur, etc., for copper or bronze matrix metals. In forming an intrinsic chemical sealing means, the matrix metal may react with the impermeable container (e.g., by partial dissolution of the container or its coating (intrinsic) or by forming a reaction product or intermetallics, etc., which may seal the filler material from the ambient atmosphere.

Further, it will be appreciated that the seal should be able to conform to volumetric (i.e., either expansion or contraction) or other changes in the reaction system without allowing ambient atmosphere to flow into the filler material (e.g., flow into the reactive atmosphere). Specifically, as molten matrix metal infiltrates into the permeable mass of filler material or preform, the depth of molten matrix metal in the container may tend to decrease. Appropriate sealing means for such a system should be sufficiently compliant to prevent gas transport from the ambient atmosphere to the filler material as the level of molten matrix metal in the container decreases.

In certain embodiments of the instant invention, the at least one second material utilized in the formation of the macrocomposite body may extend above the surface level of the molten matrix alloy after the matrix alloy has been disposed within the impermeable container. In this situation, the molten matrix metal should also form a seal with the second material at the interface between the molten matrix metal, the second material, and the ambient atmosphere. The above discussion, relating to the seal between the molten matrix metal and the impermeable container, also applies to the seal between the molten matrix metal and the second material, when such a seal is necessary.

A barrier means may also be utilized in combination with the present invention. Specifically, a barrier means which may be used in the method of this invention may be any suitable means which interferes, inhibits, prevents or terminates the migration, movement, or the like, of molten matrix metal beyond the defined surface boundary of the filler material. Suitable barrier means may be any material, compound, element, composition, or the like, which, under the process conditions of this invention, maintains some structural integrity, is not volatile and is capable of locally inhibiting, stopping, interfering with, preventing, or the like, continued infiltration or any other kind of movement beyond the defined surface boundary of the filler material. Barrier means may be used during self-generated vacuum infiltration or in any impermeable container utilized in connection with the self-generated vacuum technique for forming metal matrix composites, as discussed in greater detail below. These barrier means facilitate the production of shaped macrocomposite bodies.

Suitable barrier means include materials which are either wettable or non-wettable by the migrating molten matrix metal under the process conditions employed, so long as wetting of the barrier means does not proceed substantially beyond the surface of barrier material (i.e., surface wetting). A barrier of this type appears to exhibit little or no affinity for the molten matrix alloy, and movement beyond the defined surface boundary of the filler material or preform is prevented or inhibited by the barrier means. The barrier reduces any final machining or grinding that may be required to produce the final macrocomposite body.

Suitable barriers particularly useful for aluminum matrix metals are those containing carbon, especially the crystalline allotropic form of carbon known as graphite. Graphite is essentially non-wettable by the molten aluminum alloy under the described process conditions. A particular preferred graphite is the graphite tape product GRAFOIL® which exhibits characteristics that prevent the migration of molten aluminum alloy beyond the defined surface boundary of the filler material. This graphite tape is also resistant to heat and is substantially chemically inert. GRAFOIL® graphite tape is flexible, compatible, conformable and resilient, and it can be made into a variety of shapes to fit most any barrier application. Graphite barrier means may also be employed as a slurry or paste or even as a paint film around and on the boundary of the filler material or preform. GRAFOIL® tape is particularly preferred because it is in the form of a flexible graphite sheet. One method of using this paper-like graphite sheet material is to wrap the filler material or preform to be infiltrated within a layer of the GRAFOIL® material. Alternatively, the graphite sheet material can be formed into a negative mold of a shape which is desired for a metal matrix composite body and this negative mold can then be filled with filler material.

In addition, other finely ground particulate materials, such as 500 grit alumina, can function as a barrier, in certain situations, so long as infiltration of the particulate barrier material would occur at a rate which is slower than the rate of infiltration of the filler material.

The barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, self-generated vacuum infiltration substantially terminates when the infiltrating matrix metal reaches the defined surface boundary and contacts the barrier means.

The present method of forming the metal matrix composite component of the macrocomposite body by a self-generating vacuum technique, in combination with the use of a barrier means, provides significant advantages over the prior art. Specifically, by utilizing the method of the present invention, a metal matrix composite body may be produced without the need for expensive or complicated processing. In one aspect of the present invention, an impermeable container, which may be commercially available or tailored to a specific need, may contain a filler material or preform of a desired shape located adjacent to, or in contact with, at least one second material, a reactive atmosphere and a barrier means for stopping infiltration of the matrix metal beyond the surface of the resultant formed macrocomposite body. Upon contact of the reactive atmosphere with the matrix metal, which may be poured into the impermeable container, and/or filler material under the process conditions, a self-generated vacuum may be created, thereby causing the molten matrix metal to infiltrate into the filler material and eventually contact at least a portion of the at least one second material. The instant method avoids the need for complex processing steps, e.g., machining of molds into complex shapes, maintaining molten metal baths, removal of formed pieces from complex-shaped molds, etc. Further, displacement of filler material by molten matrix metal is substantially minimized by providing a stable container which is not submerged within a molten bath of metal.

Various demonstrations of the present invention are included in the Examples immediately following. However, these Examples should be considered as being illustrative and should not be construed as limiting the scope of the invention as defined in the appended claims.

EXAMPLE 1

The following Example demonstrates a method of bonding a ceramic matrix body to a stainless steel body through the utilization of an aluminum metal matrix composite interlayer.

A stainless steel rod, having approximate dimensions of ½ inch in diameter and 2½ inches in length, was placed in an upright position within an impermeable container comprising a commercially available alumina crucible, having approximate dimensions of 1½ inches in inner diameter and 2½ inches in height, so that one end of the steel rod rested on the bottom of the alumina crucible. The annular space between the outer surface of the steel rod and the inner surface of the alumina crucible was then filled with an approximately ¾ inch thick layer of a filler material comprising 54 grit silicon carbide particles. The outer surface of the steel rod had been previously coated with a solution of a $B_2O_3$ powder in water. The $B_2O_3$ powder had been obtained from Aesar Company of Seabrook, N.H. A quantity of solid matrix metal comprising an aluminum alloy having an approximate composition by weight of 2.5–3.5% Zn, 3.0–4.0% Cu, 7.5–9.5% Si, 0.8–1.5% Fe, 0.20–0.30% Mg, <0.50% Mn, <0.35% Sn, and <0.50% Ni, the balance being aluminum, was placed within the impermeable container, which was at room temperature, on top of the silicon carbide filler material. The setup, consisting of the impermeable container and its contents, was then placed into a resistance heated air atmosphere box furnace which was preheated to a temperature of about 600° C. The furnace temperature was then raised to approximately 900° C. over a 1.5 hour period, during which time the solid matrix alloy melted to form an approximately ¾ inch layer of molten matrix alloy within the annular space between the stainless steel rod and the alumina crucible. The molten matrix metal was then covered with a seal forming material. Specifically, a $B_2O_3$ powder from Aesar Company of Seabrook, N.H., was placed onto the surface of the molten aluminum matrix metal. After about 15 minutes at about 900° C., the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional one hour at about 900° C. Thereafter, the setup was removed from the furnace and placed into direct contact with a water cooled copper chill plate to directionally solidify the matrix metal. An analysis of the final structure of the setup showed that the molten matrix metal had infiltrated the silicon carbide filler material to form a metal matrix composite which was bonded to both the alumina crucible and the stainless steel rod, thus forming a solid macrocomposite body wherein a ceramic body (the alumina crucible) was bonded to a metal body (the stainless steel rod) by a metal matrix composite interlayer. In addition, a layer of residual matrix metal, which had not infiltrated the silicon carbide filler material, was bonded to the alumina crucible, the metal matrix composite interlayer, and the steel rod, at the upper surface of the setup.

Figure 3:
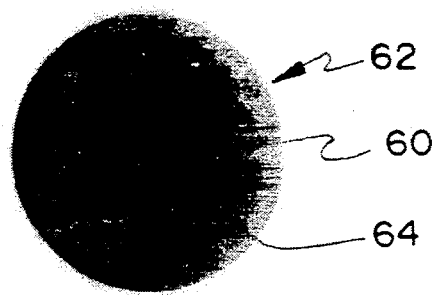
FIG. 3 is a photograph of a horizontal cross-section of the final macrocomposite body formed in Example 1.

FIG. 3 is a photograph of a horizontal cross-section of the final macrocomposite body formed in the instant Example. The cross-section was taken below the residual layer of matrix metal and above the bottom of the alumina crucible. This cross-section shows the stainless steel rod (60) bonded to the alumina crucible (62) by the metal matrix composite interlayer (64).

EXAMPLE 2

The following Example demonstrates a method of forming a macrocomposite body comprising a ceramic matrix composite body bonded to an aluminum metal matrix composite body. This Example also demonstrates the utilization of mechanical bonding in combination with other bonding mechanisms.

Figure 4:
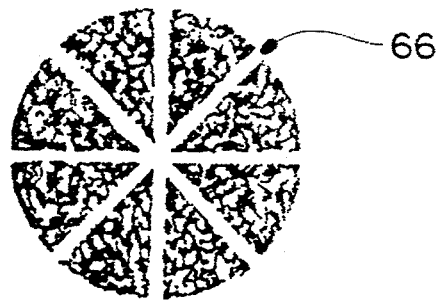
FIG. 4 is a top view of the four slots in the upper surface of the ceramic matrix composite body utilized in Examples 2, 3, 4, 5, and 7.
Figure 5:
FIG. 5 is a photograph of the final macrocomposite body formed in Example 2.

A cylindrical ceramic matrix composite body comprising a silicon carbide filler material embedded by an alumina matrix was placed on top of a layer of 500 grit alumina powder (38 ALUNDUM® from Norton Company) contained within an impermeable container having about a 1½ inch inner diameter and about a 2¼ inch height and constructed from 16 gauge AISI type 304 stainless steel. The container was made by welding a 16 gauge stainless steel tube having about a 1½ inch inner diameter and about a 2¼ inch length to a 1¾ inch by 1¾ inch 16 gauge stainless steel plate. The cylindrical ceramic matrix composite body, described above, was made by the techniques set forth in the following commonly owned U.S. patent applications, the entire disclosures of which are expressly incorporated herein by reference: U.S. patent application Ser. No. 06/819,397, filed on Jan. 17, 1986, and now allowed, in the names of Marc S. Newkirk, et al. and entitled "Composite Ceramic Articles and Methods of Making Same", and U.S. patent application Ser. No. 07/338,471, filed on Apr. 14, 1989, which is a Rule 62 Continuation of U.S. Ser. No. 06/861,025, filed May 8, 1986, and now abandoned, both in the names of Marc S. Newkirk, et al. and entitled "Shaped Ceramic Composites and Methods of Making the Same". The annular space between the surface of the ceramic matrix composite body corresponding to the outer diameter of the cylindrical ceramic matrix composite body and the inner surface of the impermeable container was filled with the above-mentioned 500 grit alumina powder until the level of the powder was approximately equal to the level of the upper surface of the ceramic matrix composite body. The 500 grit powder, under the conditions of this Example, acted as a barrier material which was impermeable to the molten matrix metal. The upper surface of the ceramic matrix composite body had four 0.035 inch wide by 0.030 inch deep slots oriented in the pattern illustrated in FIG. 4. The slots (66) were tilted about 8 degrees from the vertical axis of the cylindrical ceramic matrix composite body. The 500 grit powder did not cover the upper surface of the ceramic matrix composite body and did not enter into the slots on the surface of the ceramic matrix composite body. The approximate dimensions of the cylindrical ceramic matrix composite body were 1⅞ inches in diameter and 5/16 inch in height. An approximately 0.125 inch thick layer of a filler material comprising 90 grit silicon carbide particles was then placed on top of the upper surface of the ceramic matrix composite body. The silicon carbide particulate also filled the slots in the upper surface of the ceramic matrix composite body. A quantity of a molten matrix metal comprising an aluminum alloy having an approximate composition by weight of 2.5-3.5% Zn, 3.0-4.0% Cu, 7.5-9.5% Si, 0.8-1.5% Fe, 5.2-5.3% Mg, <0.50% Mn, <0.35% Sn, and <0.50% Ni, the balance being aluminum, was poured into the container, which was at room temperature, to cover the silicon carbide filler material. The molten matrix metal was at a temperature of about 800° C. The molten matrix metal was then covered with a seal forming material. Specifically, a $B_2O_3$ powder from Aesar Company of Seabrook, N.H., was placed onto the molten aluminum matrix metal. The setup, comprising the impermeable stainless steel container and its contents, was placed into a resistance heated air atmosphere box furnace which was preheated to a temperature of about 800° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 2 hours at 800° C. Thereafter, the setup was removed from the furnace and the stainless steel plate, which defined the bottom of the impermeable container, was placed in direct contact with a water cooled copper chill plate to directionally solidify the matrix metal. After the setup was cooled to room temperature it was disassembled to obtain a macrocomposite body comprising a metal matrix composite body which was bonded to a ceramic matrix composite body. The metal matrix section of the macrocomposite was then ground to approximately 0.015 inches in thickness. This final macrocomposite body, shown in FIG. 5, was subjected to a series of thermal shock tests to determine whether the metal matrix composite body (68) would separate from the ceramic matrix composite body (70) due to thermal shocking. The thermal shock test comprised a thermal cycling in which the macrocomposite body was raised to a temperature of 500° C. in a furnace having an air atmosphere and maintained for 15 minutes at 500° C. before being removed from the furnace to a room temperature air atmosphere environment for 15 minutes. After the macrocomposite body was subjected to the room temperature environment for 15 minutes, it was placed back in the 500° C. furnace and the cycle was repeated. After the cycle was repeated six times, no bonding failure or separation of the metal matrix composite body from the ceramic matrix composite body was observed.

EXAMPLE 3

The following Example demonstrates a method of forming a macrocomposite body comprising a ceramic matrix composite body bonded to a stainless steel body through the utilization of an aluminum metal matrix composite interlayer.

Figure 6:
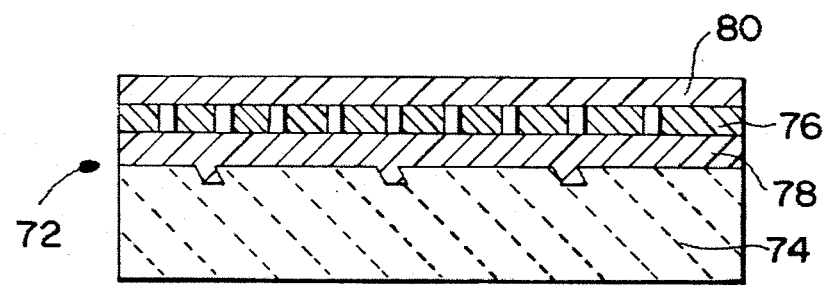
FIG. 6 is a vertical cross-sectional view of the macrocomposite body formed in Example 3.

A cylindrical ceramic matrix composite body, having approximate dimensions of one inch in diameter and ¼ inch in height, and comprised of a silicon carbide filler material embedded within an alumina matrix was placed on top of a layer of 500 grit alumina powder (38 ALUNDUM ® from Norton Company) contained within an impermeable container having about a 1½ inch inner diameter and a 2¼ inch height. The ceramic matrix composite body was produced by the techniques set forth in the commonly owned patent applications discussed in Example 2. The upper surface of the ceramic matrix composite body had four 0.035 inch wide by 0.030 inch deep slots oriented in the pattern illustrated in FIG. 4. The slots were tilted about 8 degrees from the vertical axis of the cylindrical ceramic matrix composite body. The impermeable container was constructed from 16 gauge AISI type 304 stainless steel and was made by welding a 16 gauge stainless steel tube having about a 1½ inch inner diameter and about a 2¼ inch length to a 1¾ inch by 1¾ inch 16 gauge stainless steel plate. A piece of writing paper was placed around the surface of the cylindrical ceramic matrix composite body corresponding to the outer diameter of the cylindrical ceramic matrix composite body. The paper extended approximately ½ inch above the upper surface of the ceramic matrix composite body, thus creating a containment area. A quantity of a filler material comprising 90 grit silicon carbide particulate was then added to the containment area so that the slots on the surface of the ceramic matrix composite body were filled with the silicon carbide filler material. Additional 90 grit silicon carbide was then added to the containment area until an approximately 1/16 inch thick layer of 90 grit silicon carbide existed on the upper surface of the ceramic matrix composite body. A perforated stainless steel plate was then placed on top of the silicon carbide particulate layer. The approximate dimensions of the circular perforated plate were one inch in diameter and 0.030 inch thick. Approximately 40 percent of the total surface area of the perforated plate was comprised of through holes each having an approximate diameter of 1/16 inch. After the perforated stainless steel plate was placed on top of the silicon carbide particulate layer, additional 90 grit silicon carbide particulate was added to the containment area. This additional silicon carbide particulate filled the perforations in the stainless steel plate and created an approximately 1/16 inch thick layer of silicon carbide on top of the upper surface of the perforated stainless steel plate. At this point, an additional quantity of 500 grit powder was added to the annular space between the outer surface of the containment area and the inner surface of the stainless steel impermeable container. The 500 grit powder was added until the level of the 500 grit powder was approximately equal to the level of the containment area. A quantity of a molten matrix metal having an approximate composition by weight of 2.5-3.5% Zn, 3.0-4.0% Cu, 7.5-9.5% Si, 0.8-1.5% Fe, 0.20-0.30% Mg, <0.50% Mn, <0.35% Sn, and <0.50% Ni, the balance being aluminum, was poured into the container, which was at room temperature, to cover the silicon carbide filler material and 500 grit flour. The molten matrix metal was at a temperature of about 900° C. The molten matrix metal was then covered with a seal forming material. Specifically, a $B_2O_3$ powder from Aesar Company of Seabrook, N.H., was placed onto the molten aluminum matrix metal. The setup, consisting of the impermeable stainless steel container and its contents, was then placed into a resistance heated air atmosphere box furnace which was preheated to a temperature of about 900° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 1.5 hours at 900° C. Thereafter, the setup was removed from the furnace and the stainless steel plate, which defined the bottom of the impermeable container, was placed into direct contact with a water cooled copper chill plate to directionally solidify the matrix metal. After cooling to room temperature, a macrocomposite body was recovered from the setup. A cross-section of this macrocomposite body is displayed in FIG. 6. As shown in FIG. 6, the macrocomposite body (72) comprised the ceramic matrix composite body (74) bonded to the perforated stainless steel plate (76) by an interlayer (78) of a metal matrix composite material comprising the 90 grit silicon carbide filler material embedded within a matrix of the above-described aluminum alloy. The interlayer of the instant macrocomposite body also extended through the perforations of the stainless steel plate and was thus bonded to the remainder of the metal matrix composite body (80) located above the perforated stainless steel plate.

EXAMPLE 4

The following Example demonstrates a method of forming a macrocomposite body comprising a ceramic matrix composite body bonded to an aluminum metal matrix composite body which is in turn bonded to a quantity of matrix metal.

Figure 7:
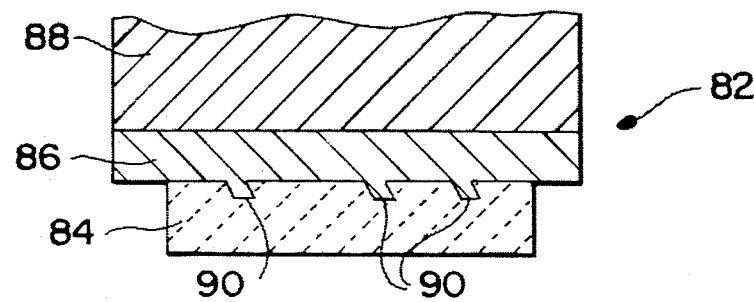
FIG. 7 is a vertical cross-sectional view of the macrocomposite body formed in Example 4.

A cylindrical ceramic matrix composite body produced by the techniques set forth in the commonly owned patent applications discussed in Example 2, and comprised of a silicon carbide filler material embedded within an alumina matrix, was placed on top of a layer of 500 grit alumina powder (38 ALUNDUM ® from Norton Company) contained within an impermeable container. The impermeable container was constructed from 16 gauge AISI type 304 stainless steel. The container was made by welding a 16 gauge stainless steel tube having about a 2⅛ inch inner diameter and about a 3 inch length to a 2½ inch by 2½ inch 16 gauge stainless steel plate. Additional 500 grit powder was added to the annular space between the outer surface of the cylindrical ceramic matrix composite body, defined by the outer diameter of the cylindrical ceramic matrix composite body, and the inner surface of the impermeable container, until the level of the powder was approximately equal to the upper surface of the cylindrical ceramic matrix composite body. The cylindrical ceramic matrix composite body had approximate dimensions of 1 9/16 inch in diameter and ¼ inch in height. Additionally, the ceramic matrix composite body had four approximately 0.035 inch wide by 0.03 inch deep slots in its upper surface. The slots were oriented in the pattern illustrated in FIG. 4. The slots were tilted about 8 degrees from the vertical axis of the cylindrical ceramic matrix composite body. An approximately ¼ inch thick layer of a filler material comprising 90 grit silicon carbide particulate was then placed on top of the upper surface of the ceramic matrix composite body and the 500 grit powder. The 90 grit silicon carbide filler material also filled the slots on the upper surface of the ceramic matrix composite body. A quantity of a molten matrix metal having an approximate composition by weight of 2.5-3.5% Zn, 3.0-4.0% Cu, 7.5-9.5% Si, 0.8–1.5% Fe, 0.20–0.30% Mg, <0.50% Mn, <0.35% Sn, and <0.50% Ni, the balance being aluminum, was poured into the impermeable container, which was at room temperature, to cover the silicon carbide filler material and the flour material. The molten matrix metal was at a temperature of about 850° C. The molten matrix metal was then covered with a seal forming material. Specifically, a $B_2O_3$ powder from Aesar Company of Seabrook, N.H., was placed onto the surface of the molten aluminum matrix metal. The setup was then placed into a resistance heated air atmosphere box furnace which was preheated to a temperature of about 850° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was then maintained in the furnace for about an additional 3 hours at 850° C. Thereafter, the setup was removed from the furnace and the stainless steel plate, which defined the bottom of the impermeable stainless steel container, was placed into direct contact with a water cooled copper chill plate to directionally solidify the matrix metal. After cooling to room temperature, the setup was disassembled to allow the recovery of a macrocomposite body. A vertical cross-section of this macrocomposite body is displayed in FIG. 7. As shown in FIG. 7, the macrocomposite body (82) comprised the ceramic matrix composite body (84) bonded to a metal matrix composite body (86) which was in turn bonded to a body of matrix metal (88). The metal matrix composite body comprised the 90 grit silicon carbide filler material embedded within a matrix of the above-described aluminum matrix alloy. The matrix metal section of the macrocomposite body was then machined until the macrocomposite body shown in FIG. 8 was obtained. The lead line numbers used in FIG. 8 designate the same components as the corresponding lead line numbers in FIG. 7.

Figure 8:
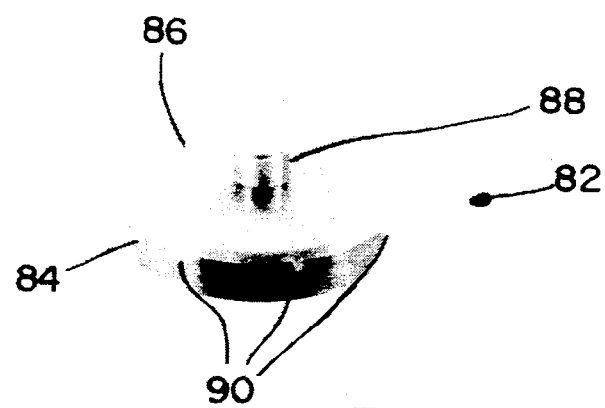
FIG. 8 is a photograph of the macrocomposite body formed in Example 4.

As shown in FIGS. 7 and 8, the metal matrix composite body (86) is mechanically bonded to the ceramic matrix composite body (84) by the metal matrix composite material which has infiltrated the four slots. Three of the infiltrated slots (90) are visible in the cross-section (FIG. 7) and in the photograph of the macrocomposite body (FIG. 8). As stated earlier in this Example, the slots are slightly tilted from the vertical axis of the cylindrical ceramic matrix composite body. As the metal matrix composite material solidifies within these slots, a mechanical bond develops between the metal matrix composite body and the ceramic matrix composite body. This mechanical bond enhances the strength of any other bond (e.g., a chemical bond) which may be present between the ceramic matrix composite body and the metal matrix composite body, and thus provides a stronger and more cohesive macrocomposite body. In addition, should any or all other bonds between the ceramic matrix composite body and the metal matrix composite body fail, the mechanical bond would still hold the two bodies together. This would tend to prevent catastrophic failure of the entire macrocomposite body when it is under certain types of stresses.

EXAMPLE 5

The following Example demonstrates a method of forming a macrocomposite body comprising a ceramic matrix composite body which is bonded to an aluminum metal matrix composite body.

Figure 9:
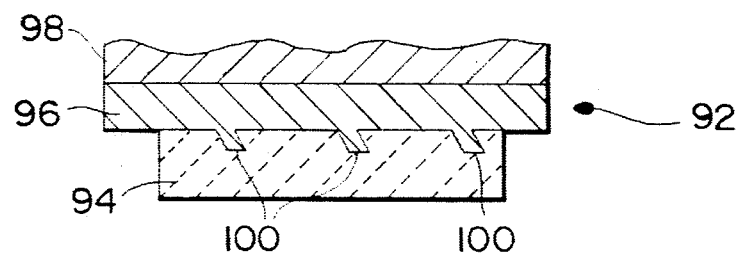
FIG. 9 is a vertical cross-sectional view of the macrocomposite body formed in Example 5.
Figure 10:
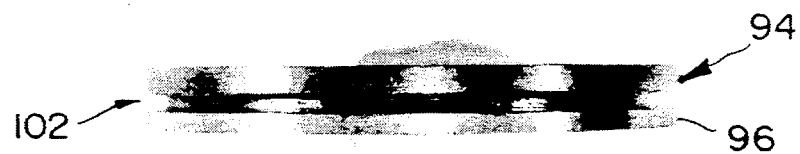
FIG. 10 is a photograph of the final macrocomposite body formed in Example 5.

A ceramic matrix composite body comprising at least one filler material contained within an alumina matrix was placed on top of a layer of 500 grit alumina powder (38 ALUNDUM ® from Norton Company) contained within an impermeable container. The impermeable container had about a 3⅛ inch inner diameter and about a 2 inch height and was constructed from 16 gauge AISI type 304 stainless steel. The container was made by welding a 16 gauge stainless steel tube having about a 3⅛ inch inner diameter and about a 2 inch length to a 3⅞ inch by 3⅞ inch 16 gauge stainless steel plate. The ceramic matrix composite body was formed by the method disclosed in commonly owned U.S. Pat. No. 4,818,734, which issued on Apr. 4, 1989, in the names of Robert C. Kantner, et al. and entitled "Method for In Situ Tailoring the Metallic Component of Ceramic Articles". The entire disclosure contained within commonly owned U.S. Pat. No. 4,818,734 is expressly incorporated herein by reference. The ceramic matrix composite body was cylindrical in shape and had approximate dimensions of 3 inches in diameter and ¼ inch in height. Additionally, the ceramic matrix composite body had four 0.035 inch wide by 0.03 inch deep slots on its upper surface. The slots were oriented in the pattern illustrated in FIG. 4. Additional 500 grit alumina powder was placed in the annular space between the outer surface of the cylindrical ceramic matrix composite body defined by the outer diameter of the cylindrical ceramic matrix composite body and the inner surface of the stainless steel impermeable container. Additional 500 grit alumina powder was added until the level of the powder within the impermeable container was approximately equal to the level of the upper surface of the ceramic matrix composite body. An approximately 0.060 inch thick layer of a filler material comprising 90 grit green silicon carbide was then placed on the upper surface of the ceramic matrix composite body and the 500 grit flour. The 90 grit green silicon carbide also filled the slots on the upper surface of the ceramic matrix composite body. A quantity of a molten matrix metal, having an approximate composition by weight of 2.5–3.5% Zn, 3.0–4.0% Cu, 7.5–9.5% Si, 0.8–1.5% Fe, 0.20–0.30% Mg, <0.50% Mn, <0.35% Sn, and <0.50% Ni, the balance being aluminum, was poured into the container, which was at room temperature, to cover the silicon carbide filler material. The molten matrix metal was at a temperature of about 850° C. The molten matrix metal was then covered with a seal forming material. Specifically, a $B_2O_3$ powder from Aesar Company of Seabrook, N.H., was placed onto the molten aluminum matrix metal. The setup, consisting of the stainless steel impermeable container and its contents, was then placed into a resistance heated air atmosphere box furnace which was preheated to a temperature of about 850° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 2.5 hours at 850° C. Thereafter, the setup was removed from the furnace and the stainless steel plate, which defined the bottom of the impermeable container, was placed into direct contact with a water cooled copper chill plate to directionally solidify the matrix metal. After the setup was cooled to room temperature, it was disassembled to recover a cylindrical macrocomposite body. FIG. 9 is a vertical cross-section of the formed macrocomposite body. As shown in FIG. 9, the macrocomposite body (92) comprised the ceramic matrix composite body (94) bonded to a metal matrix composite body (96) which was in turn bonded to a layer of residual matrix metal (98) which had not infiltrated the filler material. The metal matrix composite body comprised the 90 grit silicon carbide filler material embedded within a matrix of the above-described aluminum alloy. The macrocomposite body was then subjected to a finishing procedure in which the layer of residual matrix metal was removed by grinding. After this finishing procedure was completed, a groove was cut into the metal matrix composite body at the approximate interface between the ceramic matrix composite body and the metal matrix composite body. The groove extended along the entire circumference of the cylindrical macrocomposite body. The final macrocomposite body is shown in FIG. 10 where the groove is labelled (102). Many of the same lead line numbers are used in both FIG. 9 and FIG. 10 to designate similar components and/or structures.

FIG. 9 also illustrates the mechanical bonding provided by the metal matrix composite filled slots (100), discussed in detail in Example 4.

EXAMPLE 6

This Example shows a method of forming a macrocomposite body comprising a series of ceramic matrix composite bodies bonded to each other by an interlayer of an aluminum metal matrix composite material and a thin layer of matrix metal.

Figure 11:
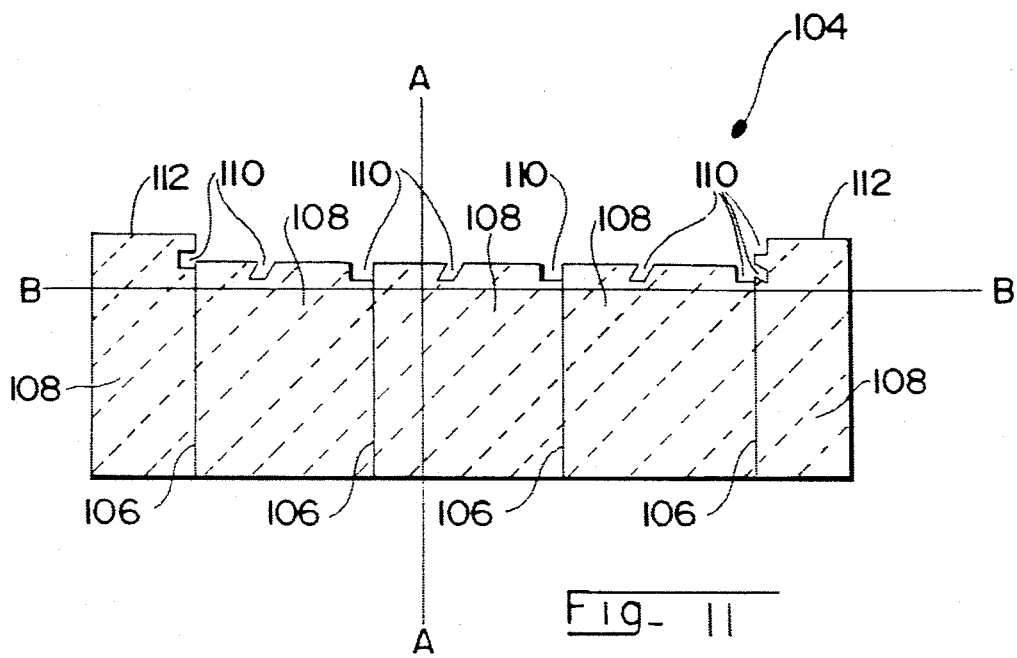
FIG. 11 is a vertical cross-sectional view of the assembly used to produce the macrocomposite body of Example 6.

FIG. 11 shows a vertical cross-section of an assembly (104) used to produce the macrocomposite body of the instant Example. The assembly (104) was formed by applying a thin layer of ELMER'S ® Wood Glue (produced by Borden Company) to surfaces (106) of ceramic matrix composite bodies (108) and then contacting the coated surfaces (106) of the ceramic matrix composite bodies (108) with each other. The ceramic matrix composite bodies were formed by the techniques set forth in the commonly owned U.S. Patent described in Example 5, and each ceramic matrix composite body comprised at least one filler material embedded within an alumina matrix. In addition, the ceramic matrix composite bodies were rectangular in shape and had slots (110) on their surfaces. Some of these slots were tilted about 8 degrees either with respect to the line A—A, or the line B—B, shown in FIG. 11, of the assembly (104). After the glue had set, the 4 inch long by 1¾ inch wide assembly was placed on top of a layer of 90 grit silicon carbide filler material contained within an impermeable container having about a 5 inch diameter and a height of about 2½ inches. The impermeable container was constructed from 16 gauge AISI type 304 stainless steel. The container was made by welding a 16 gauge stainless steel tube having about a 5 inch inner diameter and about a 2½ inch length to a 6 inch by 6 inch 16 gauge stainless steel plate. Additional 90 grit silicon carbide filler material was then added to the impermeable container until the entire assembly was buried under a layer of the silicon carbide filler material. The final level of the silicon carbide filler material was approximately ⅛ of an inch above surfaces (112) of the assembly. The slots (110) were also filled with the 90 grit silicon carbide filler material. A quantity of a molten matrix metal having an approximate composition by weight of 2.5–3.5% Zn, 3.0–4.0% Cu, 7.5–9.5% Si, 0.8–1.5% Fe, 0.20–0.30% Mg, <0.50% Mn, <0.35% Sn, and <0.50% Ni, the balance being aluminum, was poured into the impermeable container, which was at room temperature, to cover the 90 grit silicon carbide filler material. The molten matrix metal was at a temperature of about 850° C. The molten matrix metal was then covered with a seal forming material. Specifically, a $B_2O_3$ powder from Aesar Company of Seabrook, N.H., was placed onto the molten aluminum matrix metal. The setup, comprising the impermeable container and its contents, was placed into a resistance heated air atmosphere box furnace which was preheated to a temperature of about 850° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 3.5 hours at about 850° C. Thereafter, the setup was removed from the furnace and the stainless steel plate, which defined the bottom of the impermeable container, was placed into direct contact with a water cooled copper chill plate to directionally solidify the matrix metal. After the setup had cooled to room temperature, it was disassembled to recover a macrocomposite body. The macrocomposite body comprised the assembly of ceramic matrix composite bodies which was completely embedded within a metal matrix composite body comprising the 90 grit silicon carbide filler material embedded within a matrix of the aluminum matrix metal described above. The metal matrix composite material was machined away from the external surfaces of the assembly of ceramic matrix composite bodies to form the final macrocomposite body displayed in FIG. 12. This macrocomposite body (114) comprised the five ceramic matrix composite bodies (108) which made up the assembly, bonded together by an interlayer (116) of metal matrix composite material which extended between at least a portion of each of the individual ceramic matrix composite bodies (108). In addition, the ceramic matrix composite bodies (108) were bonded together by interlayers (118) of matrix metal which infiltrated into those portions of the assembly which had previously been occupied by ELMER'S ® Wood Glue. Thus, the final macrocomposite body (114) comprised an assembly of ceramic matrix composite bodies which are bonded to a metal matrix composite interlayer (116) and, in addition, both the metal matrix composite interlayer (116) and the ceramic matrix composite bodies (108) are bonded to thin interlayers (118) of matrix metal which exist between the individual ceramic matrix composite bodies (108).

Figure 12:
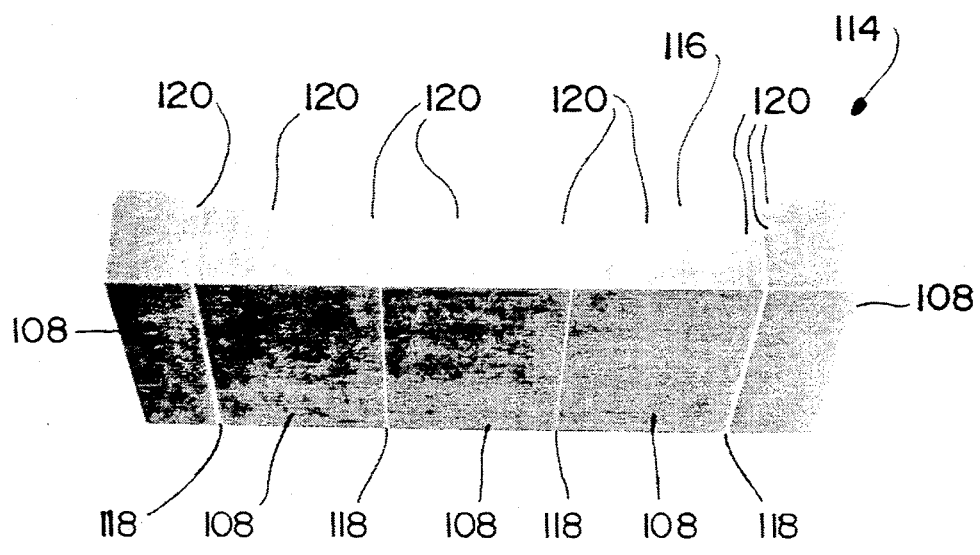
FIG. 12 is a photograph of the final macrocomposite body formed in Example 6.

FIG. 12 also illustrates the mechanical bonding provided by the metal matrix composite filled slots (120), discussed in detail in Example 4. It should be noted that the macrocomposite body of the instant Example has horizontal metal matrix composite filled slots on the ceramic matrix composite bodies located at each end of the macrocomposite body. These metal matrix composite filled horizontal slots, when combined with the metal matrix composite filled vertical slots located on the other ceramic matrix composite bodies, provide the macrocomposite body with a two-dimensional mechanical locking system.

EXAMPLE 7

This Example demonstrates a method of forming a macrocomposite body comprising an aluminum metal matrix composite body which is bonded both to a ceramic matrix composite body and to an assembly comprising a perforated stainless steel plate which is welded to a threaded stainless steel rod.

Figure 13:
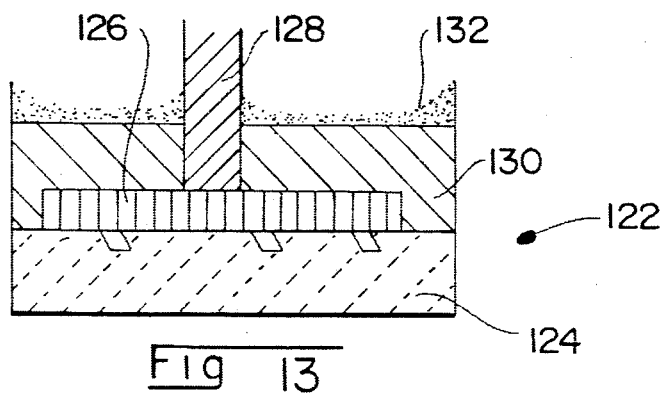
FIG. 13 is a vertical cross-sectional view of the macrocomposite body formed in Example 7.

A ceramic matrix composite body formed by the techniques set forth in the commonly owned patent applications described in Example 2 and comprising a filler material embedded by an alumina matrix, was placed within an impermeable container. The impermeable container was constructed from 16 gauge AISI type 304 stainless steel. The container was made by welding a 16 gauge stainless steel tube having about a 2⅛ inch inner diameter and about a 3 inch length to a 2½ inch by 2½ inch 16 gauge stainless steel plate. The diameter of the cylindrical ceramic matrix composite was approximately equal to the inner diameter of the impermeable container. In addition, the ceramic matrix composite body had four 0.035 inch wide by 0.03 inch deep slots on its upper surface. The slots were oriented in the pattern shown in FIG. 4. Further, the slots were tilted about 8 degrees from the vertical axis of the cylindrical ceramic matrix composite body. A quantity of a filler material comprising 90 grit silicon carbide particulate was placed upon the surface of the ceramic matrix composite body so as to fill the slots and extend in a very thin layer above the surface of the ceramic matrix composite body. An assembly comprising a perforated stainless steel plate welded to one end of a threaded stainless steel rod was then placed on top of the silicon carbide filler material so that one face of the perforated stainless steel plate was in contact with the layer of silicon carbide filler material and the other face, which was welded to the stainless steel rod was facing away from the ceramic matrix composite body. The perforated stainless steel plate was circular in geometry and had approximate dimensions of 1¾ inch in diameter and 0.03 inch in thickness. In addition, approximately 40 percent of the total surface area of the perforated plate was comprised of through holes each having an approximate diameter of 1/16 inch. Additional 90 grit silicon carbide filler material was then added to the impermeable container until the upper surface of the perforated stainless steel plate was covered with an approximately ⅛ inch thick layer of the silicon carbide filler material. The silicon carbide filler material extended through the perforations within the stainless steel plate to contact the silicon carbide filler material below the perforated stainless steel plate. The silicon carbide filler material also surrounded and contacted the base of the stainless steel rod. A quantity of a molten matrix metal, having an approximate composition by weight of 2.5-3.5% Zn, 3.0-4.0% Cu, 7.5-9.5% Si, 0.8-1.5% Fe, 0.20-0.30% Mg, <0.50% Mn, <0.35% Sn, and <0.50% Ni, the balance being aluminum, was poured into the impermeable container, which was at room temperature, to cover the silicon carbide filler material and surround a portion of the stainless steel rod. The molten matrix metal was at a temperature of about 800° C. The molten matrix metal was covered with a seal forming material. Specifically, a $B_2O_3$ powder from Aesar Company of Seabrook, N.H., was placed onto the molten aluminum matrix metal. The setup, consisting of the impermeable container and its contents, was placed into a resistance heated air atmosphere box furnace which was preheated to a temperature of about 800° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 2 hours at 800° C. Thereafter, the setup was removed from the furnace and the stainless steel plate, which defined the lower surface of the impermeable container, was placed into direct contact with a water cooled copper chill plate to directionally solidify the matrix metal. After cooling to room temperature, the setup was disassembled to recover a macrocomposite body. As shown in FIG. 13, which is a vertical cross-section of the macrocomposite body, the macrocomposite body (122) comprised the ceramic matrix composite body (124) bonded to the assembly comprising the perforated stainless steel plate (126) and threaded rod (128), by an interlayer (130) of a metal matrix composite material. In addition, the metal matrix composite interlayer (130) was also bonded to some residual uninfiltrated matrix metal (132), which was in turn bonded to the threaded stainless steel rod (128). The metal matrix composite material comprised the 90 grit silicon carbide filler material embedded within the aluminum matrix metal described above. The metal matrix composite material completely surrounded the perforated stainless steel plate and also extended through the perforations to bond the metal matrix composite material below the stainless steel plate to the metal matrix composite material above the stainless steel plate.

Figure 14:
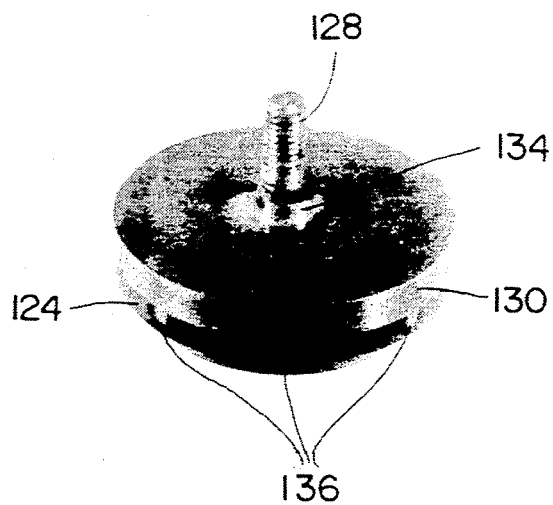
FIG. 14 is a photograph of the finished macrocomposite body formed in Example 7.

FIG. 14 is a photograph of the finished macrocomposite body which was produced by removing most of the residual matrix metal by grinding. FIG. 14 uses many of the same lead line numbers as FIG. 13 to designate similar components or structures. As shown in FIG. 14, a collar (134) of residual matrix metal was allowed to remain around the base of the threaded stainless steel rod (128). The perforated stainless steel plate is not visible in FIG. 14 because it is completely embedded within the metal matrix composite interlayer (130).

FIG. 14 also illustrates the mechanical bonding provided by the metal matrix composite filled slots (136), discussed in detail in Example 4.

EXAMPLE 8

This Example demonstrates a method of producing a macrocomposite body comprising two stainless steel tubes arranged in a concentric manner and bonded together by an aluminum metal matrix composite interlayer located between the outer surface of the inner stainless steel tube and the inner surface of the outer stainless steel tube.

Figure 15:
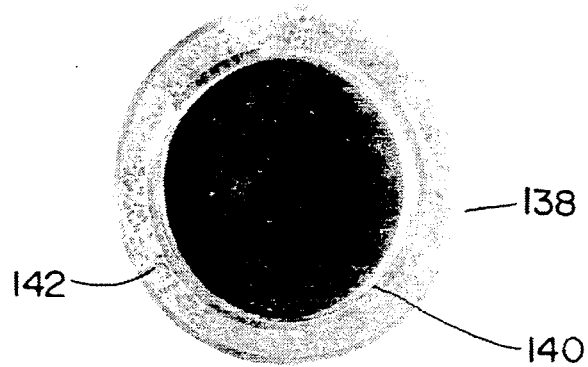
FIG. 15 is a picture of a horizontal cross-section of the cylindrical macrocomposite body formed in Example 8.

A first assembly was created by welding a 16 gauge AISI type 304 stainless steel tube having about a 1 9/16 inch inner diameter and about a 4¾ inch length to a 2½ inch by 2½ inch 16 gauge stainless steel plate. A second 16 gauge AISI type 304 stainless steel tube having about a 2⅛ inch inner diameter and about a 6¼ inch length was placed around the first stainless steel tube so as to be concentric with the first stainless steel tube. The second stainless steel tube was in turn welded to the 2½ inch by 2½ inch 16 gauge stainless steel plate to create an impermeable container. The inner tube was then filled with 500 grit alumina powder (38 ALUNDUM ® from Norton Company) until the level of the 500 grit powder was approximately equal with the upper rim of the inner tube. The upper end of the inner tube was then sealed by forming a layer of a calcium aluminate mixture, produced by mixing Secar 71 cement from Lafarge Calcium Aluminates, Chesapeake, Va., with water, across the upper surface of the inner tube. The annular volume between the outer surface of the inner tube and the inner surface of the outer tube was then filled with 14 grit silicon carbide particulate. After the above-described annular volume was filled with the 14 grit silicon carbide, a layer of 50 grit silicon carbide particulate was placed on top of the layer of 14 grit silicon carbide and ultrasonically vibrated into the layer of 14 grit silicon carbide particulate. Thus, after the ultrasonic vibration step, the annular volume between the outer surface of the inner tube and the inner surface of the outer tube was filled with a mixture of 14 and 50 grit silicon carbide particulate to a level approximately equal with the sealed upper end of the inner stainless steel tube. A quantity of a molten matrix metal, comprising a commercially available aluminum alloy designated 6061, was poured into the volume defined by the inner surface of the outer stainless steel tube, which was at room temperature, to cover the silicon carbide filler material and the sealed upper end of the inner stainless steel tube. The molten matrix metal was at a temperature of about 900° C. The molten matrix metal was then covered with a seal forming material. Specifically, a $B_2O_3$ powder from Aesar Company of Seabrook, N.H., was placed onto the molten aluminum matrix metal. The setup, comprising the impermeable container and its contents, was placed within a resistance heated air atmosphere box furnace which was preheated to a temperature of about 900° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 2 hours at 900° C. Thereafter, the setup was removed from the furnace and the stainless steel plate, which defined the bottom surface of the setup, was placed into direct contact with a water cooled copper chill plate to directionally solidify the matrix metal. After the setup had cooled to room temperature, the stainless steel plate was cut away from the stainless steel tubes and the metal matrix composite. In addition, the upper end of the outer stainless steel tube was cut off at a level slightly below the sealed upper end of the inner stainless steel tube. The final cylindrical macrocomposite body comprised two concentric stainless steel tubes bonded together by a metal matrix composite interlayer. The metal matrix composite body comprised a mixture of 14 and 50 grit silicon carbide filler material embedded by a matrix of the aluminum matrix alloy described above. A horizontal cross-section of the cylindrical macrocomposite body formed in the instant Example is displayed in FIG. 15, wherein the outer stainless steel tube is labelled (138), the inner stainless steel tube is labelled (140), and the metal matrix composite interlayer is labelled (142).

EXAMPLE 9

This Example demonstrates a method of forming a macrocomposite body comprising an aluminum metal matrix composite body bonded to a body of metal.

Figure 16:
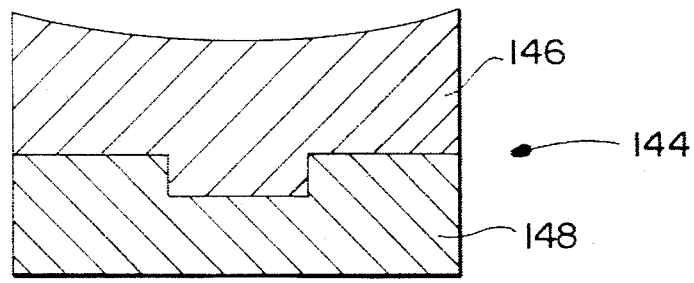
FIG. 16 is a vertical cross-sectional view of the macrocomposite body formed in Example 9.

An approximately ¼ inch thick layer of 180 grit green silicon carbide particulate was placed in the bottom of an impermeable container. The container was made by welding a 16 gauge AISI type 304 stainless steel tube having about a 2⅛ inch inner diameter and about a 3 inch length to a 2½ inch by 2½ inch 16 gauge stainless steel plate. A cylindrical ingot of 6061 aluminum alloy having dimensions of approximately 0.75 inch in diameter and approximately 1 inch in height was placed on top of the layer of silicon carbide particulate so that one circular end of the cylinder was sitting on the particulate and the 1 inch height dimension was perpendicular to the layer of silicon carbide particulate. An additional ½ inch layer of silicon carbide particulate was then added to the impermeable container so that the silicon carbide particulate surrounded the cylindrical aluminum ingot to approximately ½ of its height. A quantity of a molten matrix metal comprising an aluminum alloy having an approximate composition by weight of 2.5-3.5% Zn, 3.0-4.0% Cu, 7.5-9.5% Si, 0.8-1.5% Fe, 0.20-0.30% Mg, <0.50% Mn, <0.35% Sn, and <0.50% Ni, the balance being aluminum, was poured into the impermeable container, which was at room temperature, to cover the silicon carbide filler material and the top ½ of the 6061 aluminum alloy ingot. The molten matrix metal was at a temperature of about 800° C. The molten matrix metal was then covered with a seal forming material. Specifically, a $B_2O_3$ powder from Aesar Company of Seabrook, N.H., was placed onto the molten aluminum matrix metal. The setup, comprising the impermeable container and its contents, was then placed into a resistance heated air atmosphere box furnace which was preheated to a temperature of about 800° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup, was maintained in the furnace for about an additional 3.5 hours at 800° C. Thereafter, the setup was removed from the furnace and the stainless steel plate which defined the bottom of the impermeable container was placed into direct contact with a water cooled copper chill plate to directionally solidify the matrix metal. After the setup reached room temperature, the setup was disassembled to recover a macrocomposite body. FIG. 16 is a vertical cross-sectional view of the macrocomposite body recovered from the setup. As shown in FIG. 16, the macrocomposite body (144) comprised a body of aluminum metal (146) bonded to a metal matrix composite body (148). The metal matrix composite body comprised the 180 grit silicon carbide filler material embedded within a matrix of the matrix metal described above.

Figure 17:
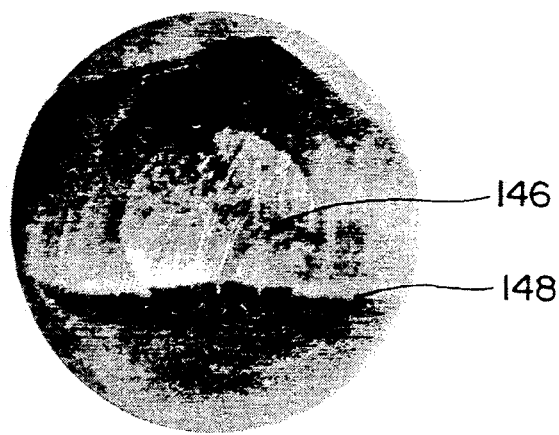
FIG. 17 is a photograph of a horizontal cross-section of the macrocomposite body formed in Example 9.

FIG. 17 is a photograph of a horizontal cross-section of the macrocomposite body formed in the instant example. The cross-section shown in FIG. 17 was taken at a level which was slightly below the upper surface of the metal matrix composite body. As shown in FIG. 17, the metal matrix composite body (148) is bonded to a body of aluminum metal (146).

EXAMPLE 10

This Example demonstrates a method of forming a macrocomposite body comprising an aluminum metal matrix composite body bonded to a metal body.

An impermeable container having about a 1 9/16 inch inner diameter and a height of about 4¾ inches was constructed from 16 gauge AISI type 304 stainless steel. The container was made by welding a 16 gauge stainless steel tube having about a 1 9/16 inch inner diameter and about a 4¾ inch length to a 2½ inch by 2½ inch 16 gauge stainless steel plate. A rod of a commercially available 6061 aluminum alloy, having approximate dimensions of one inch in diameter and 3 inches in length, was placed within the impermeable container so that one end of the rod rested on the bottom of the impermeable container. The end of the rod which was in contact with the bottom of the impermeable container had a circular lip which increased the diameter of the rod so that it had approximately the same diameter, 1 9/16, as the inner diameter of the cylindrical portion of the impermeable container. The circular lip was approximately ¼ inch in height. The annular space between the outer surface of the rod above the circular lip and the inner surface of the impermeable container was then filled with a filler material comprising 24 grit silicon carbide particulate. The level of the silicon carbide particulate was approximately equal to the upper end of the aluminum rod. A quantity of a molten matrix metal comprising an aluminum alloy having a composition by weight of approximately 2.5-3.5% Zn, 3.0-4.0% Cu, 7.5-9.5% Si, 0.8-1.5% Fe, 0.20-0.30% Mg, <0.50% Mn, <0.35% Sn, and <0.50% Ni, the balance being aluminum, was poured into the impermeable container, which was at room temperature, to cover the silicon carbide filler material and the upper surface of the aluminum rod. The molten matrix metal was at a temperature of about 900° C. The molten matrix metal was then covered with a seal forming material. Specifically, a $B_2O_3$ powder from Aesar Company of Seabrook, N.H., was placed onto the molten aluminum matrix metal. The setup, consisting of the impermeable container and its contents, was then placed into a resistance heated air atmosphere box furnace which was preheated to a temperature of about 900° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 2 hours at 900° C. Thereafter, the setup was removed from the furnace and the stainless steel plate which formed the bottom of the impermeable container was placed into direct contact with a water cooled copper chill plate to directionally solidify the matrix metal. Upon reaching room temperature, the lower end of the setup was cut off at a point slightly above the lip on the aluminum rod. In addition, the top of the setup was cut off at a level slightly below the upper end of the aluminum rod. The stainless steel cylinder was then removed to reveal a macrocomposite body comprising a rod of aluminum alloy bonded to a cylindrical metal matrix composite shell comprising the 24 grit silicon carbide particulate embedded within a matrix of the matrix metal described above.

Figure 18:
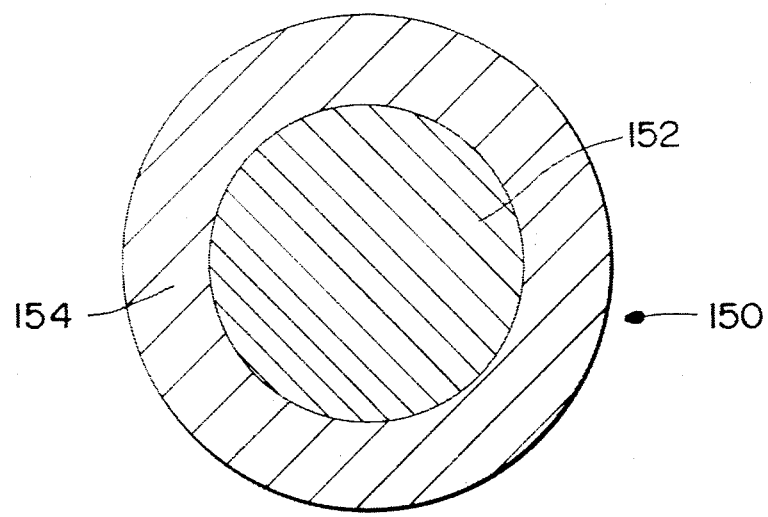
FIG. 18 is a horizontal cross-sectional view of the macrocomposite body formed in Example 10.

FIG. 18 shows a horizontal cross-section of the macrocomposite body formed by the instant Example. As shown in FIG. 18, the macrocomposite body (150) comprises the rod of aluminum alloy (152) bonded to a cylindrical metal matrix composite shell (154).

EXAMPLE 11

This Example demonstrates a method of forming a macrocomposite body comprising two concentric stainless steel tubes bonded together by a bronze metal matrix composite interlayer.

A first 16 gauge stainless steel tube having about a 1 9/16 inch inner diameter and about a 4¾ inch length, was welded to a 2½ inch by 2½ inch 16 gauge AISI type 304 stainless steel plate to form a first assembly. A second larger 16 gauge AISI type 304 stainless steel tube was placed around the first stainless steel tube so as to be concentric with the first stainless steel tube. The second stainless steel tube, which had about a 2⅜ inch inner diameter and about a 6½ inch length, was welded to the same 2½ inch by 2½ inch 16 gauge stainless steel plate as the first stainless steel tube to form an impermeable container. A circular plate of 16 gauge AISI type 304 stainless steel of the same diameter as the inner stainless steel tube was welded to the top of the inner stainless steel tube so as to seal off the top of that tube. The annular space between the outer surface of the inner stainless steel tube and the inner surface of the outer stainless steel tube was then filled with a filler material comprising a 90 grit alumina product known as 38 ALUNDUM ® from Norton Company. The level of the 90 grit alumina filler material was approximately equal to the level of the top of the sealed inner stainless steel tube. A quantity of a molten matrix metal comprising a bronze alloy having an approximate composition by weight of 90 percent copper, 5 percent silicon, 2 percent iron, and 3 percent zinc, was poured into the impermeable container, which was at room temperature, to cover the filler material and the sealed surface of the inner stainless steel tube. The molten matrix metal was at a temperature of about 1100° C. The molten matrix metal was then covered with a seal forming material. Specifically, a $B_2O_3$ powder from Aesar Company of Seabrook, N.H., was placed onto the molten bronze matrix metal. The setup, consisting of the impermeable container and its contents, was then placed into a resistance heated air atmosphere box furnace which was preheated to a temperature of about 1100° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 4 hours at 1100° C. Thereafter, the setup was removed from the furnace and the stainless steel plate which defined the bottom of the setup was placed into direct contact with a water cooled copper chill plate to directionally solidify the matrix metal. After the setup had cooled to room temperature, the stainless steel plate was cut away from the stainless steel tubes and metal matrix composite. In addition, the upper end of the second assembly was cut away at a level which was slightly below the top of the sealed inner stainless steel tube. The resulting macrocomposite body comprised two concentric stainless steel tubes bonded together by a metal matrix composite interlayer.

Figure 19:
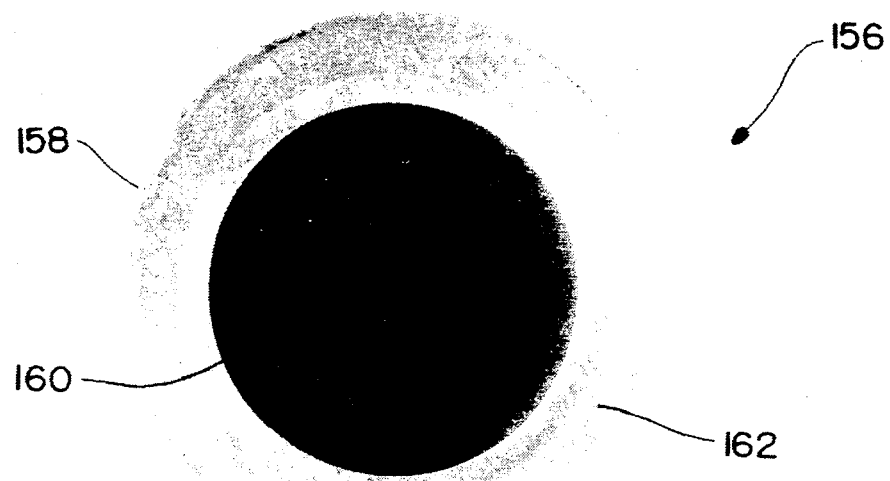
FIG. 19 is a photograph of a horizontal cross-section of the macrocomposite body formed in Example 11.

FIG. 19 is a photograph of a horizontal cross-section of the macrocomposite body formed in the instant Example. As shown in FIG. 19, the macrocomposite body (156) comprised two concentric stainless steel tubes, an outer tube (158) and an inner tube (160), bonded together by a bronze metal matrix composite interlayer (162).

EXAMPLE 12

This Example demonstrates a method of forming a macrocomposite body comprising a hollow stainless steel tube bonded to a bronze metal matrix composite body.

An impermeable container was constructed by welding a first 16 gauge AISI type 304 stainless steel tube having about a 1 9/16 inch inner diameter and a 4¾ inch length to a 2½ inch by 2½ inch 16 gauge stainless steel plate to form a first assembly. A second larger 16 gauge AISI type 304 stainless steel tube was placed around the first stainless steel tube so as to be concentric with the first stainless steel tube. The second stainless steel tube, which had about a 2⅛ inch inner diameter and about a 6½ inch length, was welded to the same stainless steel plate as the first stainless steel tube to form an impermeable container. A circular 16 gauge AISI type 304 stainless steel plate was then welded to the top of the inner (first) stainless steel tube. This circular stainless steel plate had a diameter which was slightly greater than the diameter of the inner stainless steel tube and once welded in place, sealed the upper end of the inner stainless steel tube. After the inner stainless steel tube was sealed, a bleed hole was drilled through the bottom of the 2½ inch by 2½ inch 16 gauge stainless steel plate into the volume defined by the inner walls of the inner stainless steel tube. This bleed hole prevented any pressure increase that may have occurred when the setup was heated from room temperature to the processing temperature. This bleed hole did not affect the impermeability of the setup because the upper end of the inner tube was sealed. The annular space between the outer surface of the inner stainless steel tube and the inner surface of the outer (second) stainless steel tube was then filled with a filler material comprising a 14 grit alumina product known as 38 ALUNDUM® from Norton Company. The level of the alumina filler material was approximately equal to the upper end of the sealed inner stainless steel tube. A quantity of a molten matrix metal comprising a bronze alloy having an approximate composition by weight of 90 percent copper, 2 percent iron, 5 percent silicon, and 3 percent zinc, was poured into the impermeable container, which was at room temperature, to cover the alumina filler material and the sealed upper end of the inner stainless steel tube. The molten matrix metal was at a temperature of about 1100° C. The molten matrix metal was then covered with a seal forming material. Specifically, a $B_2O_3$ powder from Aesar Company of Seabrook, N.H., was placed onto the molten bronze matrix metal. The setup, consisting of the impermeable container and its contents, was then placed in a resistance heated air atmosphere box furnace which was preheated to a temperature of about 1100° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 2 hours at 1100° C. Thereafter, the setup was removed from the furnace and the stainless steel plate which defined the bottom of the setup was placed into direct contact with a water cooled copper chill plate to directionally solidify the matrix metal. After the setup had cooled to room temperature, the lower stainless steel plate was cut away from the two stainless steel tubes and the metal matrix composite interlayer. In addition, the upper end of the setup was cut off at a layer slightly below the upper end of the inner stainless steel tube. The macrocomposite body recovered from the setup comprised two concentric stainless steel tubes bonded together by a metal matrix composite interlayer. The metal matrix composite interlayer comprised the 14 grit alumina filler material embedded within a matrix of the bronze matrix alloy described above. After the two ends of the setup were removed, the outer stainless steel tube was also removed to form a final macrocomposite body which comprised a stainless steel tube bonded to a bronze metal matrix composite shell.

Figure 20:
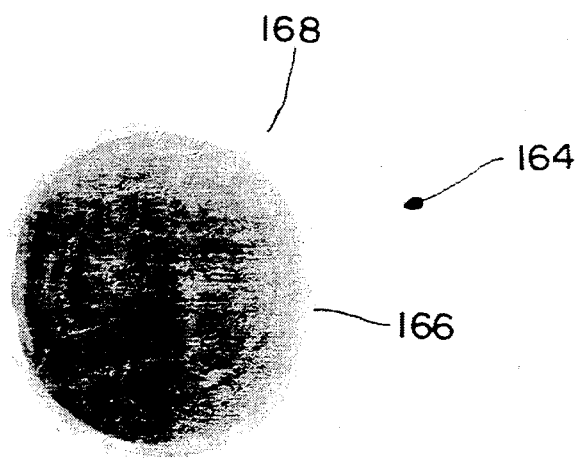
FIG. 20 is a photograph of a horizontal cross-section of the final macrocomposite body formed in Example 12.

FIG. 20 is a photograph of a horizontal cross-section of the final macrocomposite body formed in the instant Example. As shown in FIG. 20, the macrocomposite body (164) comprised the inner stainless steel tube (166) bonded to a metal matrix composite shell (168).

EXAMPLE 13

This Example demonstrates a method of forming a macrocomposite body comprising a stainless steel rod bonded to a stainless steel tube by a bronze metal matrix composite interlayer. The stainless steel rod and stainless steel tube were concentric.

A first assembly was created by welding a stainless steel rod having a diameter of approximately 1 inch and a height of approximately 4.5 inches to a 2½ inch by 2½ inch 16 gauge stainless steel plate. A 16 gauge AISI type 304 stainless steel tube, having an inner diameter of approximately 1⅜ inches and a length of approximately 6 inches, was placed around the stainless steel rod so as to be concentric with the stainless steel rod. The stainless steel tube was then welded to the 2½ inch by 2½ inch stainless steel plate to form an impermeable container. The annular space between the outer surface of the stainless steel rod and the inner surface of the stainless steel tube was then filled with a filler material comprising a 90 grit alumina product known as 38 ALUNDUM® from Norton Company. The level of the 90 grit filler material was approximately equal to the upper end of the stainless steel rod. A quantity of a molten matrix metal comprising a bronze alloy having an approximate composition by weight of 90 percent copper, 5 percent silicon, 2 percent iron, and 3 percent zinc, was poured into the impermeable container, which was at room temperature, to cover the alumina filler material and the upper end of the stainless steel rod. The molten matrix metal was at a temperature of about 1100° C. The molten matrix metal was then covered with a seal forming w material Specifically, a $B_2O_3$ powder from Aesar Company of Seabrook, N.H., was placed on the molten bronze matrix metal. The setup, comprising the impermeable container and its contents, was then placed into a resistance heated air atmosphere box furnace which was preheated to a temperature of about 1100° C. After about 15 minutes at temperature, the $B_2O_3$ material had substantially completely melted to form a glassy layer. Moreover, any water which had been trapped in the $B_2O_3$ material substantially completely degassed, thereby forming a gas impermeable seal. The setup was maintained in the furnace for about an additional four hours at 1100° C. Thereafter, the setup was removed from the furnace and the stainless steel plate which defined the bottom of the setup was placed into direct contact with a water cooled copper chill plate to directionally solidify the matrix metal. After the setup had cooled to room temperature, the bottom of the setup was cut off at a level slightly above the level of the bottom stainless steel plate. In addition, the upper end of the setup was cut off at a level slightly below the level of the upper end of the stainless steel rod. The final cylindrical macrocomposite body recovered from the setup comprised a stainless steel rod bonded to a stainless steel tube by a metal matrix composite interlayer. The metal matrix composite comprised the 90 grit alumina filler material embedded by a matrix of the bronze alloy described above.

Figure 21:
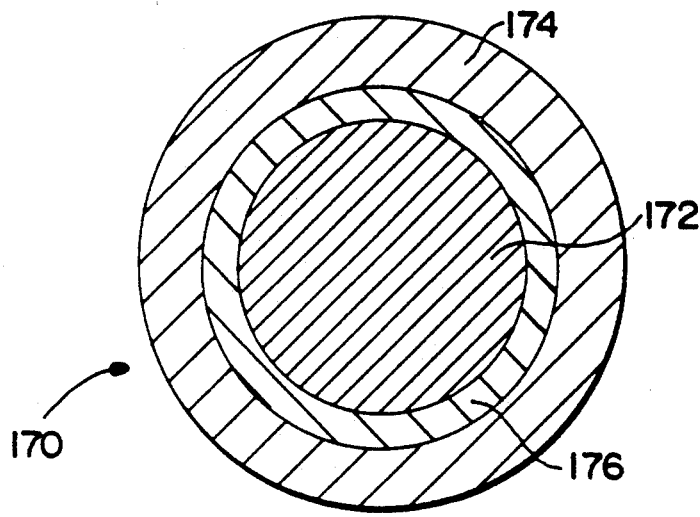
FIG. 21 is a horizontal cross-sectional view of the macrocomposite body formed in Example 13.

FIG. 21 is a horizontal cross-sectional view of the macrocomposite body formed in the instant Example. As shown in FIG. 21, the macrocomposite body (170) comprised a stainless steel rod (172) bonded to a stainless steel tube (174) by a bronze metal matrix composite interlayer (176).

An approximately 5/16 inch thick cross-section of the cylindrical macrocomposite body formed in this Example, and illustrated in FIG. 21, was subjected to a shear test to determine the bonding strength of the metal matrix composite material to the stainless steel rod. The cross-sectional disk was placed on a steel ring such that the alumina filled bronze metal matrix was contacting the steel ring. A ram was then contacted with the stainless steel center and pressure was applied to the ram so as to push the stainless steel center in a direction perpendicular to the diameter of the macrocomposite disk. The test was conducted in a Forney compression/Universal testing machine (Model FT-0060-D) made by Forney, Inc., Wampum, Pa. A maximum load of about 8210 pounds over a shear area of about 0.989 square inches gave a measured shear strength of about 8300 psi.

EXAMPLE 14

This Example demonstrates a method of forming a macrocomposite body which comprises a bronze metal matrix composite body bonded to a metal body.

A sheet of commercially available GRAFOIL® graphite tape material, produced by Union Carbide, was placed on the bottom of an impermeable container so as to cover the entire bottom of the impermeable container. The impermeable container was made by welding 16 gauge stainless steel plates together to form a square container having inner dimensions of 4 inches square by 1½ inches in height. An approximately ⅛ inch thick layer of a filler material comprising a 90 grit alumina product known as 38 ALUNDUM® from Norton Company, was placed on top of the GRAFOIL® sheet. A square plate of cold formed steel having approximate dimensions of 3½ inches square by ⅜ inch thick was placed on top of the layer of alumina filler material. Additional 90 grit alumina filler material was then placed within the impermeable container until the level of the alumina filler material was approximately equal to the upper surface of the cold formed steel piece. A second sheet of GRAFOIL® was then placed over the top of the cold formed steel piece. The GRAFOIL® sheet extended over the edges of the cold formed steel piece and partially covered the layer of alumina filler material. An approximately ¼ inch gap existed between the edges of the sheet of GRAFOIL® and the inner surface of the impermeable container. A quantity of a molten matrix metal comprising a bronze alloy having an approximate composition by weight of 90 percent copper, 5 percent silicon, 2 percent iron, and 3 percent zinc was poured into the impermeable container, which was at room temperature, to cover the GRAFOIL® sheet and the exposed alumina filler material. The molten matrix metal was at a temperature of about 1100° C. The molten matrix metal was then covered with a seal forming material. Specifically, a $B_2O_3$ powder from Aesar Company of Seabrook, N.H., was placed onto the molten bronze matrix metal. The setup, comprising the impermeable container and its contents, was placed into a resistance heated air atmosphere box furnace which was preheated to a temperature of about 1100° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 3 hours at 1100° C. Thereafter, the setup was removed from the furnace and the stainless steel plate which defined the bottom of the impermeable container was placed into direct contact with a water cooled copper chill plate to directionally solidify the matrix metal. After the setup had cooled to room temperature, the setup was disassembled to recover a macrocomposite body. The macrocomposite body comprised a metal matrix composite body bonded to the cold formed steel piece.

Figure 22:
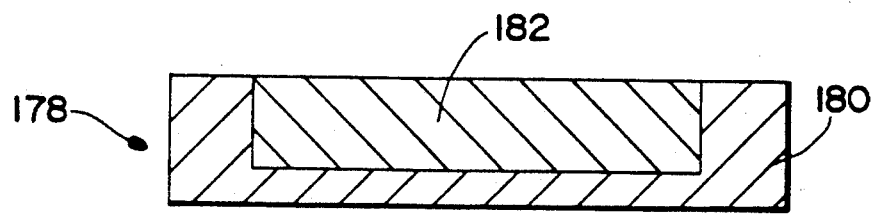
FIG. 22 is a vertical cross-sectional view of the macrocomposite body formed in Example 14.

FIG. 22 is a vertical cross-sectional view of the macrocomposite body formed in the instant Example. As shown in FIG. 22, the macrocomposite body (178) comprised a bronze metal matrix composite body (180) bonded to the cold formed steel piece (182).

EXAMPLE 15

The instant Example demonstrates a method of forming a macrocomposite body comprising a bronze metal matrix composite body bonded to another bronze metal matrix composite body having a different filler material. In addition, the instant Example demonstrates a method of forming a macrocomposite body having a low density.

An approximately ⅛ inch thick layer of a filler material comprising 90 grit silicon carbide was placed on the bottom of an impermeable container. The impermeable container was made by welding a 16 gauge AISI type 304 stainless steel tube having about a 2 inch inner diameter and about a 2½ inch length to a 2⅞ inch by 2⅞ inch 16 gauge stainless steel plate. An approximately ¾ inch thick layer of alumina aerospheres was placed on top of the layer of 90 grit silicon carbide. The alumina aerospheres were spherical in shape, having a 3.2 mm diameter, and were produced by Ceramic Fillers Inc., Atlanta, Ga. An additional layer of 90 grit silicon carbide filler material was placed on top of the layer of alumina aerospheres. The setup, comprising the impermeable container and its contents, was then gently vibrated to allow the 90 grit silicon carbide filler material to sink into and fill in (i.e., be located in) at least some of the porosity between the alumina aerospheres. When no additional 90 grit silicon carbide would sink into the porosity between the aerospheres, an additional quantity of 90 grit silicon carbide was added to the setup to create a ⅛ inch thick layer of silicon carbide on top of the alumina aerospheres. A stainless steel plate having approximate dimensions of 1⅞ inch in diameter and ⅛ inch thick was placed on top of the upper layer of silicon carbide. The stainless steel plate had a diameter which was slightly less than the inner diameter of the impermeable container, thus providing a slight gap between the edge of the stainless steel plate and the inner surface of the stainless steel tube. A quantity of a molten matrix metal comprising a bronze alloy having an approximate composition by weight of 90 percent copper, 5 percent silicon, 2 percent iron, and 3 percent zinc, was poured into the impermeable container, which was at room temperature, to cover the stainless steel plate and the exposed silicon carbide filler material. The molten matrix metal was at a temperature of about 1100° C. The molten matrix metal was then covered with a seal forming material. Specifically, a $B_2O_3$ powder from Aesar Company of Seabrook, N.H., was placed onto the molten bronze matrix metal. The setup, comprising the impermeable container and its contents, was then placed into a resistance heated air atmosphere box furnace which was preheated to a temperature of about 1100° C. After about 15 minutes at temperature, the $B_2O_3$ material had substantially completely melted to form a glassy layer. Moreover, any water which had been trapped in the $B_2O_3$ substantially completely degassed, thereby forming a gas impermeable seal. The setup was maintained in the furnace for about an additional 2 hours at 1100° C. Thereafter, the setup was removed from the furnace and the stainless steel plate which defined the lower surface of the impermeable container was placed into direct contact with a water cooled copper chill plate to directionally solidify the matrix metal. After the setup had cooled to room temperature, the setup was disassembled to recover a macrocomposite body. The macrocomposite body comprised a first layer of metal matrix composite material comprising the 90 grit silicon carbide filler material embedded within a matrix of the bronze matrix metal described above, bonded to a second layer of metal matrix composite material comprising the alumina aerospheres embedded within a matrix of the bronze matrix metal described above, which was in turn bonded to a third layer of metal matrix composite material comprising the 90 grit silicon carbide filler material embedded within a matrix of the bronze matrix metal described above. The upper metal matrix composite layer was removed from the macrocomposite body to produce a two layer macrocomposite body comprised of the metal matrix composite body containing the aerospheres bonded to the metal matrix composite body containing the 90 grit silicon carbide filler material. The density of this piece was approximately 3.9 g/cm$^3$. The normal density of a metal matrix composite body comprising approximately 50 percent by volume of a 90 grit silicon carbide filler material embedded by a bronze alloy similar to the bronze alloy utilized in the instant experiment is approximately 5.5 g/cm$^3$.

Figure 23:
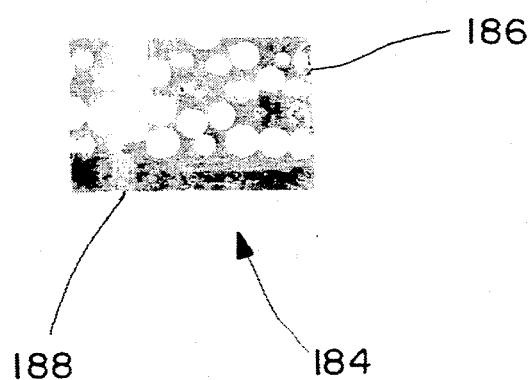
FIG. 23 is a photograph of a vertical cross-section of the final two-layer macrocomposite body formed in Example 15.

FIG. 23 is a photograph of a vertical cross-section of the final two layer macrocomposite body formed in the instant Example. As shown in FIG. 23, the macrocomposite body (184) comprised a bronze metal matrix composite body containing the alumina aerospheres as filler material (186) bonded to a bronze metal matrix composite body containing the 90 grit silicon carbide filler material (188).

What is claimed is:

1. A method of making a macrocomposite body comprising the steps of:
   (a) forming a reaction system comprising: (1) an impermeable container, (2) a matrix metal, (3) a permeable mass of filler material or a preform, (4) at least one second material adjacent to said permeable mass, and (5) a reactive atmosphere;
   (b) at least partially sealing the reaction system at least at an interface between the impermeable container and the matrix metal, the sealing being provided by at least one extrinsic seal comprising at least one at least partially molten glassy material;
   (c) heating the at least partially sealed reaction system to a temperature above the melting point of the matrix metal to create a self-generated vacuum within said reaction system: (1) to develop, for at least a portion of said at least partially sealing, a pressure differential between said reactive atmosphere within said at least partially sealed reaction system and an ambient atmosphere external to said at least partially sealed reaction system; (2) to permit infiltration of the molten matrix metal into the permeable mass of filler material or preform; and (3) to cause the molten matrix metal to contact at least a portion of said at least one second material; and
   (d) cooling the at least partially sealed reaction system to a temperature below the melting point of the matrix metal, after the molten matrix metal has infiltrated the permeable mass of filler material or preform and contacted at least a portion of the at least one second material, to form said macrocomposite body.

2. The method of claim 1, wherein (1) said matrix metal comprises at least one material selected from the group consisting of aluminum, bronze, copper, magnesium and cast iron; (2) said permeable mass comprises at least one material selected from the group consisting of powders, flakes, platelets, microspheres, whiskers, bubbles, fibers, particulates, fiber mats, chopped fibers, spheres, pellets, tubules and refractory cloths; and (3) said impermeable container comprises at least one material selected from the group consisting of a ceramic, a metal, a glass and a polymer.

3. The method of claim 1, wherein said at least partially sealing comprises substantially completely isolating said reactive atmosphere from said ambient atmosphere.

4. The method of claim 1, wherein said reactive atmosphere reacts at least partially with at least one of said matrix metal, said permeable mass and said impermeable container, thereby resulting in said pressure differential which exists between said ambient atmosphere which is external to said reaction system and said reactive atmosphere during at least a portion of said infiltrating of molten matrix metal into said permeable mass.

5. The method of claim 4, wherein said reactive atmosphere reacts at least partially with said matrix metal thereby resulting in said pressure differential.

6. The method of claim 1, further comprising providing at least one wetting enhancer to said reaction system.

7. The method of claim 6, wherein said at least one wetting enhancer is alloyed with said matrix metal.

8. The method of claim 6, wherein said matrix metal comprises aluminum and said wetting enhancer comprises at least one material selected from the group consisting of magnesium, bismuth, lead and tin.

9. The method of claim 6, wherein said matrix metal comprises at least one of bronze and copper and said wetting enhancer comprises at least one material selected from the group consisting of selenium, tellurium and sulfur.

10. The method of claim 1, further comprising providing at least one seal facilitator to said reaction system.

11. The method of claim 1, wherein said at least one at least partially molten glassy material comprises at least one material selected from the group consisting of boron glasses, silicon glasses and $B_2O_3$.

12. The method of claim 11, wherein said at least one second or additional body comprises at least one material selected from the group consisting of a metal, a ceramic, a ceramic matrix composite, a metal matrix composite and combinations thereof.

13. The method of claim 1, wherein said at least partially sealing further comprises an intrinsic chemical seal comprising a reaction product of said matrix metal and said ambient atmosphere.

14. The method of claim 1, wherein said at least partially sealing further comprises an intrinsic physical seal comprising a wetting of said impermeable container by said matrix metal.

15. The method of claim 1, wherein said at least partially sealing further comprises an intrinsic chemical seal comprising a reaction product of said matrix metal and said impermeable container.

16. The method of claim 1, further comprising providing a barrier means which defines at least a portion of a surface of said permeable mass.

17. The method of claim 16, wherein said barrier means comprises at least one material selected from the group consisting of carbon, graphite, titanium diboride, alumina, silica and stainless steel.

18. The method of claim 16, wherein said barrier means is substantially non-wettable by said matrix metal.

19. The method of claim 1, wherein said permeable mass comprises at least one material selected from the group consisting of powders, flakes, platelets, microspheres, whiskers, bubbles, fibers, particulates, fiber mats, chopped fibers, spheres, pellets, tubules and refractory cloths.

20. The method of claim 1, wherein said filler comprises at least one material selected from the group consisting of oxides, carbides and nitrides.

21. The method of claim 1, wherein said impermeable container comprises at least one material selected from the group consisting of a ceramic, a metal, a glass and a polymer.

22. The method of claim 1, wherein said matrix metal comprises a material selected from the group consisting of aluminum, copper and bronze and said impermeable container comprises stainless steel.

23. The method of claim 21, wherein said impermeable container comprises alumina or silicon carbide.

24. The method of claim 1, wherein said reactive atmosphere comprises at least one material selected from the group consisting of an oxygen-containing atmosphere and a nitrogen-containing atmosphere.

25. The method of claim 1, wherein said matrix metal comprises aluminum and said reactive atmosphere comprises air, oxygen or nitrogen.

26. The method of claim 1, wherein said matrix metal comprises at least one of a bronze matrix metal, a copper matrix metal and a cast iron matrix metal and said reactive atmosphere comprises air, oxygen or nitrogen.

27. The method of claim 1, wherein the temperature of said reaction system is greater than the melting point of said matrix metal, but less than the volatilization temperature of said matrix metal and the melting point of said filler.

28. The method of claim 1, wherein said at least partially sealed reaction system is heated to a temperature of: about 700° C.–1000° C. when said matrix metal comprises aluminum; about 1050° C.–1125° C. when said matrix metal comprises bronze or copper; and about 1250° C.–1400° C. when said matrix metal comprises cast iron.

29. The method of claim 2, wherein said permeable mass comprises at least one material selected from the group consisting of alumina, silicon carbide, zirconia, titanium nitride, boron carbide and mixtures thereof.

30. The method of claim 1, further comprising directionally solidifying at least said metal matrix composite portion of said macrocomposite body.

31. The method of claim 1, wherein one or both of said metal matrix composite body and said at least one second material comprises notches, holes, slots, or any other surface irregularities which are matched with a corresponding inversely shaped surface irregularity on the surface to which the metal matrix composite body or the at least one second material is to be integrally attached or bonded and wherein said matching surface irregularities create a mechanical attachment or bond in addition to any attachment or bond which may exist between said matrix composite body and said at least one second material.

32. A method for producing a macrocomposite comprising:
   (a) forming a reaction system comprising: (1) an impermeable container, (2) a mass of filler or a preform, and (3) a matrix metal;
   (b) juxtaposing at least one second or additional body relative to a mass of filler or preform such that when said matrix metal infiltrates said mass of filler or preform, the matrix metal comes into contact with at least a portion of said at least one second or additional body;
   (c) heating the reaction system to a temperature above the melting point of the matrix metal but below the melting point of the filler or preform;
   (d) at least partially sealing the reaction system, said at least partially sealing comprising at least one at least partially molten glassy material, at least at an interface between the impermeable container and the matrix metal to create a self-generated vacuum within said reaction system, to develop, for at least a portion of said at least partially sealing, a pressure differential between a reactive atmosphere within said at least partially sealed reaction system and an ambient atmosphere external to said at least partially sealed reaction system;
   (e) infiltrating at least a portion of said filler material or preform with at least a portion of said matrix metal to form a metal matrix composite body;
   (f) continuing said infiltration until said matrix metal comes in contact with at least a portion of said at least one second or additional body; and
   (g) cooling said matrix metal to a temperature below the melting point of the matrix metal to form a body of excess matrix metal which is integrally attached or bonded to said at least one second or additional body.

33. The method of claim 32, wherein said second or additional body has a greater coefficient of thermal expansion than said metal matrix composite body so that said second or additional body retains at least a portion of said metal matrix composite body under compression; or wherein said metal matrix composite body has a greater coefficient of thermal expansion than said second or additional body so that said metal matrix composite body retains at least a portion of said second or additional body under compression.

34. The method of claim 32, wherein the volume of said metal matrix composite body is less than the volume of said body of excess matrix metal.

35. The method of claim 34, wherein said metal matrix composite body comprises a thin layer on the surface of said body of excess matrix metal.

36. The method of claim 32, wherein the volume of said metal matrix composite body is greater than the volume of said body of excess matrix metal.

37. The method of claim 36, wherein said body of excess matrix metal comprises a thin layer on the surface of said metal matrix composite body.

38. The method of claim 32, wherein said second or additional body comprises an interconnected or bonded assemblage of at least two bodies selected from the group consisting of ceramic bodies, ceramic matrix composite bodies, metal bodies and metal matrix composite bodies.

39. The method of claim 32, wherein one or both of said metal matrix composite body and said second or additional body comprises notches, holes, slots, or any other surface irregularities which are matched with a corresponding inversely shaped surface irregularity on the surface to which the metal matrix composite body or the second or additional body is to be integrally attached or bonded and wherein said matching surface irregularities create a mechanical attachment or bond in addition to any attachment or bond which may exist between said metal matrix composite body and said second or additional body.

40. A method for producing a macrocomposite comprising:
  (a) forming a reaction system: (1) an impermeable container, (2) a mass of filler or a preform, and (3) a matrix metal;
  (b) juxtaposing at least one second or additional body relative to said mass of filler or preform such that when said matrix metal infiltrates said mass of filler or preform, the matrix metal comes into contact with at least a portion of said at least one second or additional body;
  (c) heating the reaction system to a temperature above the melting point of the matrix metal but below the melting point of the filler material or preform;
  (d) at least partially sealing the reaction system, said at least partially sealing comprising at least one at least partially molten glassy material, at least at an interface between the impermeable container and the matrix metal to create a self-generated vacuum within said reaction system to develop, for at least a portion of said at least partially sealing, a pressure differential between a reactive atmosphere within said at least partially sealed reaction system and an ambient atmosphere external to said at least partially sealed reaction system;
  (e) infiltrating at least a portion of said mass of filler material or preform with said matrix metal to form a metal matrix composite body;
  (f) continuing said infiltration until said matrix metal comes in contact with at least a portion of the at least one second or additional body; and
  (g) cooling said matrix metal to a temperature below the melting point to form a macrocomposite comprising said metal matrix composite body which is integrally attached to or bonded with said at least one second or additional body.

41. The method of claim 36, wherein said integral attachment or bond of said metal matrix to said at least one second or additional body comprises at least one method of bonding selected from the group consisting of mechanical, physical and chemical attachment.

42. The method of claim 40, wherein said integral attachment or bond of said metal matrix to said at least one second body comprises mechanical attachment.

43. The method of claim 42, wherein said mechanical attachment comprises infiltration of said matrix metal into at least a portion of a microstructure of said at least one second or additional body.

44. The method of claim 42, wherein said mechanical attachment comprises infiltration of said matrix metal into at least a portion of a groove or slot on a surface of said at least one second or additional body.

45. The method of claim 40, wherein one or both of said metal matrix composite body and said second or additional body comprises notches, holes, slots, or any other surface irregularities which are matched with a corresponding inversely shaped surface irregularity on the surface to which the metal matrix composite body or the second or additional body is to be integrally attached or bonded and wherein said matching surface irregularities create a mechanical attachment or bond in addition to any attachment or bond which may exist between said metal matrix composite body and said second or additional body.

* * * * *